United States Patent [19]

Orita et al.

[11] Patent Number: 5,533,007
[45] Date of Patent: Jul. 2, 1996

[54] ISDN LINE CIRCUIT MONITOR SYSTEM

[75] Inventors: Akira Orita; Takaaki Kawakami; Tetsuya Sakata, all of Kawasaki, Japan

[73] Assignee: Fujitsu Limited, Kawasaki, Japan

[21] Appl. No.: 324,495

[22] Filed: Oct. 18, 1994

Related U.S. Application Data

[63] Continuation of Ser. No. 754,954, Sep. 4, 1991, abandoned.

[30] Foreign Application Priority Data

Sep. 4, 1990 [JP] Japan ................................. 2-234025
Feb. 8, 1991 [JP] Japan ................................. 3-016726

[51] Int. Cl.$^6$ ............................................. H04J 3/14
[52] U.S. Cl. ................. 370/17.000; 370/68; 370/68.1; 370/110.1
[58] Field of Search ................................. 370/13, 14, 17, 370/110.1; 379/93, 96, 68, 68.1, 58.1, 58.2

[56] References Cited

U.S. PATENT DOCUMENTS

| | | | |
|---|---|---|---|
| 4,730,313 | 3/1988 | Stephenson et al. | 370/17 |
| 4,965,795 | 10/1990 | Coffelt et al. | 370/13 |
| 4,989,202 | 1/1991 | Soto et al. | 370/13 |
| 4,998,240 | 3/1991 | Williams | 370/13 |
| 5,027,343 | 6/1991 | Chan et al. | 370/13 |

*Primary Examiner*—Hassan Kizou
*Attorney, Agent, or Firm*—Staas & Halsey

[57] ABSTRACT

In an ISDN line circuit channel monitor system having a digital line circuit controller, a line circuit network and a call processor accommodating network, there are provided monitor equipment and a connection making part. The monitor equipment is coupled to the digital line circuit controller, the first network or the second network, and monitors D and B channels of a basic interface and a primary rate interface. The connection making part connects to the monitor equipment time slots related to a monitored channel of a terminal in conformity with either the basic interface or the primary rate interface.

16 Claims, 19 Drawing Sheets

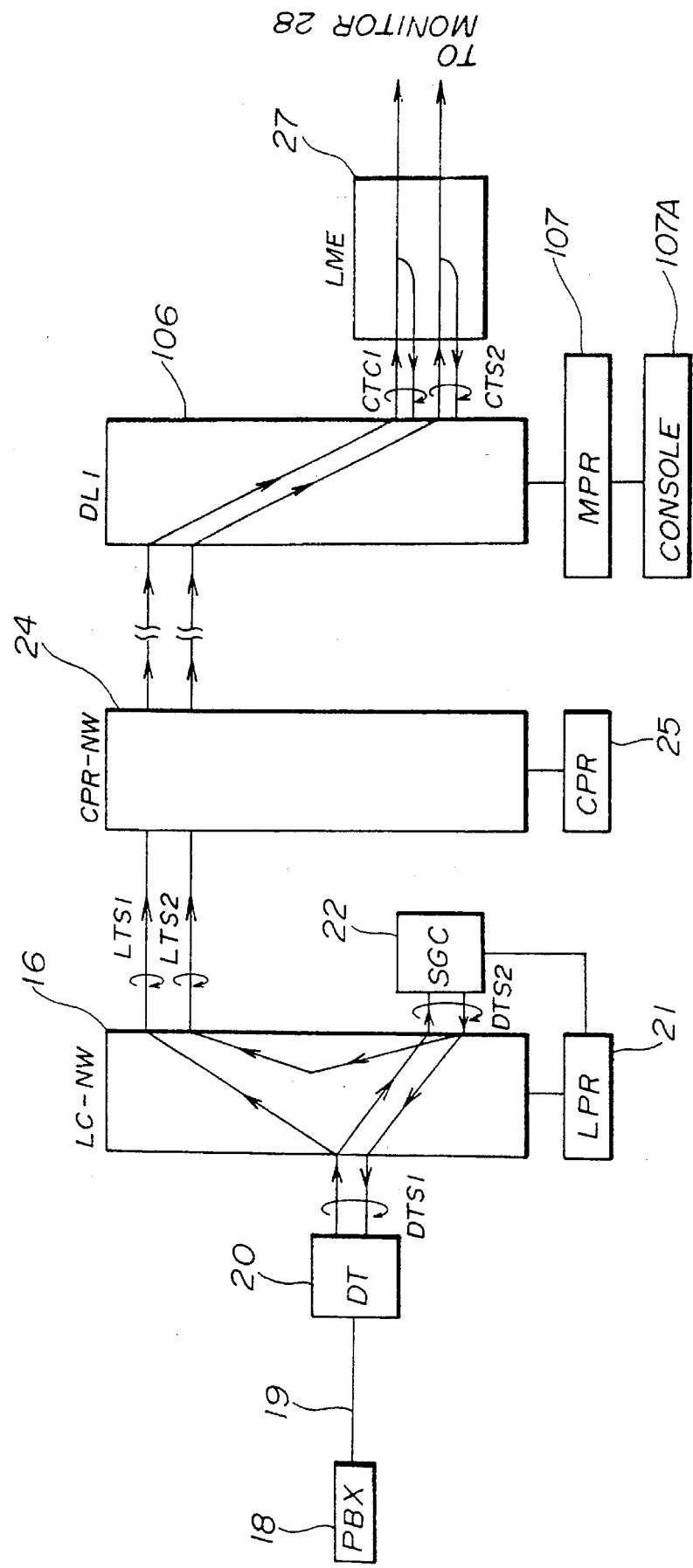

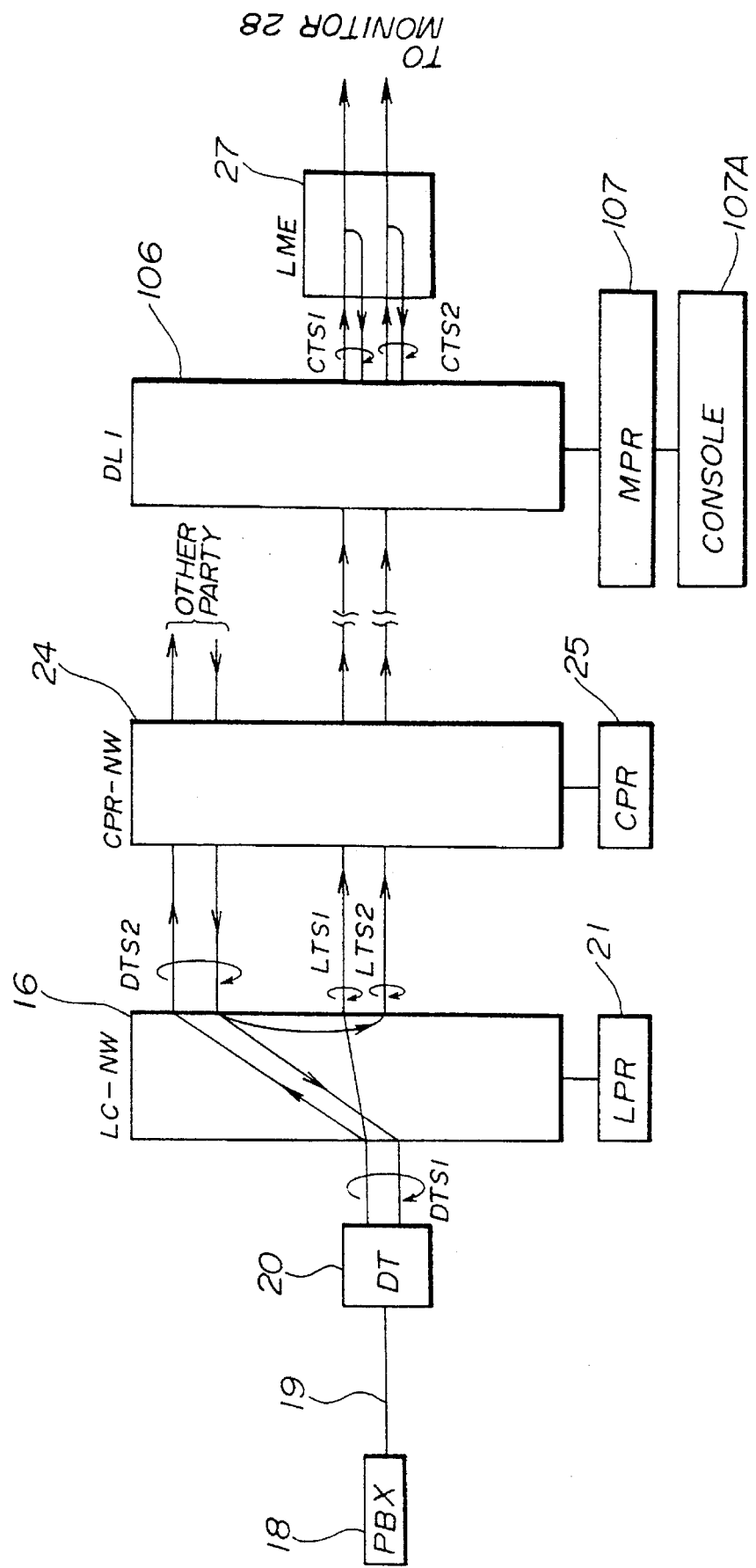

ISDN LINE CIRCUIT MONITOR SYSTEM

This application is a continuation of application Ser. No. 07/754,954, filed Sep. 4, 1991, now abandoned.

BACKGROUND OF THE INVENTION

1. Field of the Invention

The present invention generally relates to an ISDN (Integrated Services Digital Network), and more particularly to an ISDN line circuit monitor system for monitoring messages transferred between a network and terminals accommodated in the network.

2. Description of the Related Art

As is well known, an ISDN uses a complex protocol defined between each terminal and a network. Such a complex protocol is different from a protocol used in a conventional telephone network. Since the protocol used in the ISDN is complex, there is a possibility that a protocol mismatch may take place, so that a terminal cannot be connected to a network or additional services cannot be used.

In order to detect such a protocol mismatch, it is necessary to store messages, which are actually transferred between the terminal and the network, and to analyze the messages. For this purpose, a conventional ISDN has monitor equipment which monitors the contents of a D channel when a line switching terminal is used, the contents of the D channel when a D channel packet is used, and the contents of a B channel when a B channel packet is used.

Since B and D channels (two 64 kbps B channels and one 16 kbps D channel) are time-division-multiplexed on each subscriber line circuit, a monitor terminal of the monitor equipment must be connected to a specific part of a hardware structure of an exchange at which the B and D channels have been separated from each other. However, it is necessary to draw a related package of the hardware structure of the exchange from a shelf in order to connect the above-mentioned monitor terminal to the related package. During this operation, the exchange services to subscribers related to the drawn package are stopped.

Further, there is a possibility that the monitor terminal may be mistakenly connected to an unwanted circuit portion since the above operation is very complicated. Furthermore, when a remote line concentration unit is used, it is necessary to bring the monitor equipment to the remote line concentration unit in order to monitor the messages between the terminal to be monitored and the network.

SUMMARY OF THE INVENTION

It is a general object of the present invention to provide an improved ISDN line circuit channel monitor system in which the above-mentioned disadvantages are eliminated.

A more specific object of the present invention is to provide an ISDN line circuit channel monitor system capable of monitoring messages at an arbitrary channel without stopping the ISDN switching services.

The above-mentioned objects of the present invention are achieved by an ISDN line circuit channel monitor system having a digital line circuit controller which separates time slots of a basic interface into D channels and B channels and generates multiplexed D channels and multiplexed B channels, a first network which multiplexes time slots of the digital line circuit controller and time slots of B and D channels of a primary rate interface, and a second network which multiplexes time slots of the first network and outputs multiplexed time slots to an ISDN, the ISDN line circuit channel monitor system comprising:

a monitor apparatus, coupled to one of the digital line circuit controller, the first network and the second network, for monitoring the D and B channels of the basic interface and the primary rate interface; and a connection apparatus, coupled to the monitor apparatus, for connecting to the monitor apparatus time slots related to a monitored channel of a terminal in conformity with one of the basic interface and the primary rate interface.

The above-mentioned objects of the present invention are also achieved by an ISDN line circuit channel monitor system having a digital line circuit controller which separates time slots of a basic interface into D channels and B channels and generates multiplexed D channels and multiplexed B channels, a first network which multiplexes time slots of the digital line circuit controller and time slots of B and D channels of a primary rate interface, and a second network which multiplexes time slots of the first network and outputs multiplexed time slots to an ISDN, the ISDN line circuit channel monitor system comprising:

a digital link interface controller coupled to the ISDN via a communication path;

a monitor apparatus, coupled to the digital link interface controller, for monitoring the D and B channels of the basic interface and the primary rate interface; and a connection apparatus, coupled to the monitor apparatus, for connecting to the monitor apparatus time slots related to a monitored channel of a terminal in conformity with one of the basic interface and the primary rate interface.

BRIEF DESCRIPTION OF THE DRAWINGS

The other objects of the present invention will become more apparent from the following detailed description when read in conjunction with the accompanying drawings, in which:

FIG. 16 is a block diagram of a connection which is made by the line circuit network when a D channel is monitored according to a fifth preferred embodiment of the present invention;

FIG. 17 is a block diagram of a connection which is made by the line circuit network when a B channel is monitored according to the fifth preferred embodiment of the present invention.

DESCRIPTION OF THE PREFERRED EMBODIMENTS

Figure 1:
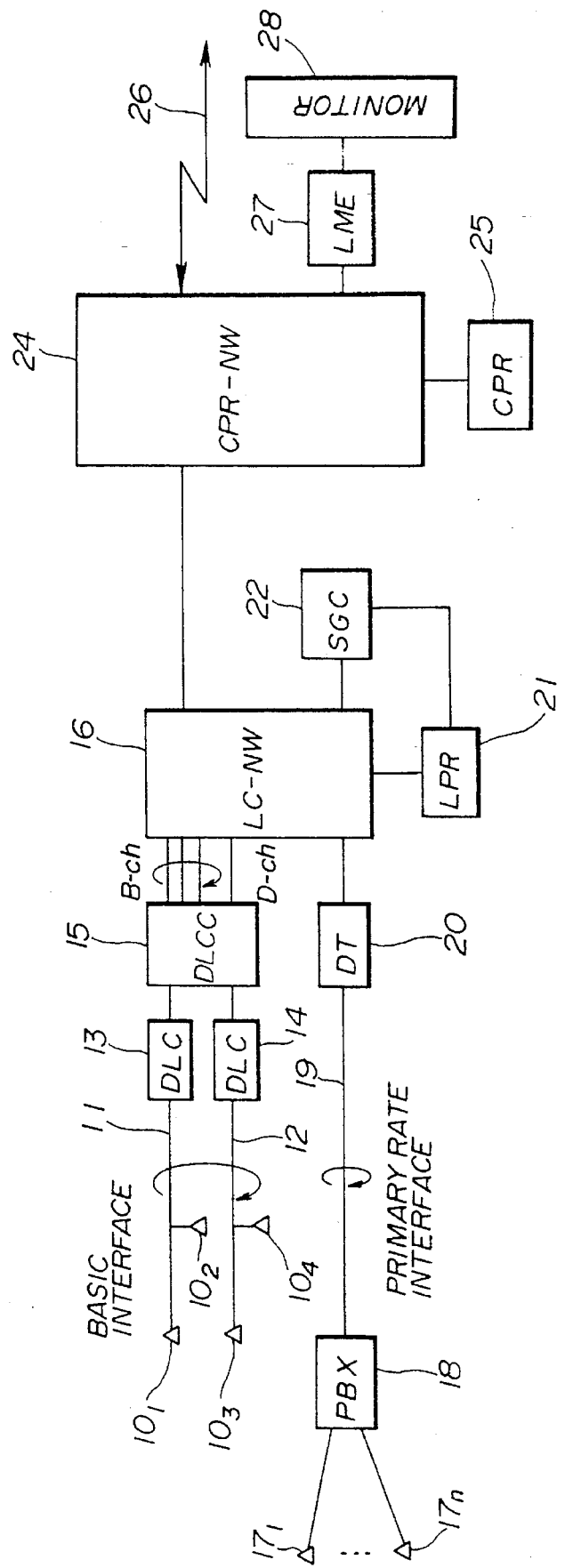
FIG. 1 is a block diagram of a first preferred embodiment of the present invention.

Referring to FIG. 1, terminals $10^1$ and $10^2$ are connected to a digital line circuit controller (DLCC) 15 via a digital line circuit (DLC) 13 by a basic interface 11. Similarly, terminals $10^3$ and $10^4$ are connected to the digital line circuit controller 15 via a digital line circuit (DLC) 14 via a basic interface 12. With respect to each of the basic interfaces 11 and 12, the DLCC 15 separates time slots related to the B channels from time slots related to the D channel, and separately multiplexes the time slots related to the B channels and the time slots related to the D channel. The DLCC 15 is coupled to a line circuit network (LC-NW) via multiplexed B-channel time slots and the multiplexed D-channel time slots.

A private branch exchange (PBX) 18, to which terminals $17_1$–$17_n$ are connected, is connected to the LC-NW 16 via a digital trunk (DT) 20 by a primary rate interface 19. Under the control of a line-concentration-stage processor (LPR) 21, the LC-NW 16 separates the multiplexed B-channel time slots and the multiplexed D-channel time slots from each other, connects the multiplexed D-channel time slots related to the interfaces 11, 12 and 19 to a signal controller (SGC) 22, and connects the multiplexed B-channel time slots to a call processor accommodating network (CPR-NW) 24.

Under the control of a call processor (CPR) 25, the CPR-NW 24 multiplexes the time slots from the LC-NW 16, and connects the multiplexed time slots to an integrated services digital network (ISDN) 26. Further, under the control of the CPR 25, the CPR-NW 24 connects the time slots of the LC-NW 16 and ISDN 26 to monitor equipment 28 via a line monitor equipment interfacer (LME) 27.

Figure 2:
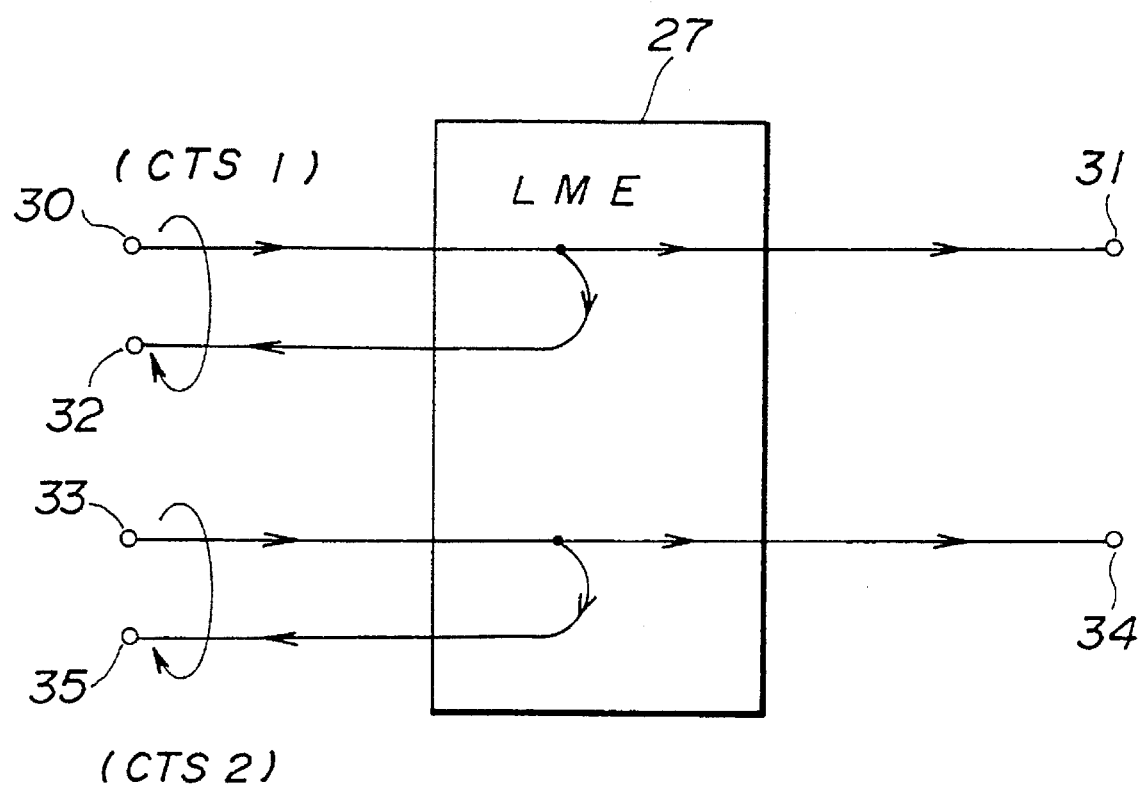
FIG. 2 is a block diagram of the operation of line monitor equipment shown in FIG. 1.

As shown in FIG. 2, the LME 27 receives, from the CPR-NW 24 via a terminal 30, a monitor time slot CTS1 in a predetermined channel of an up highway, and outputs the monitor time slot CTS1 to the monitor device 28 via a terminal 31. In addition, the LME 27 loop-backs the above-mentioned monitor time slot CTS1 to the CPR-NW 24 via a terminal 32. Further, the LME 27 outputs, to the monitor device 28 via a terminal 34, a monitor time slot CTS2 in a predetermined channel of a down highway supplied from the CPR-NW 24 via a terminal 33, and loop-backs the monitor time slot CTS2 to the CPR-NW 24 via a terminal 35. The above-mentioned functions of the LME 27 can be easily realized by known art.

Figure 3:
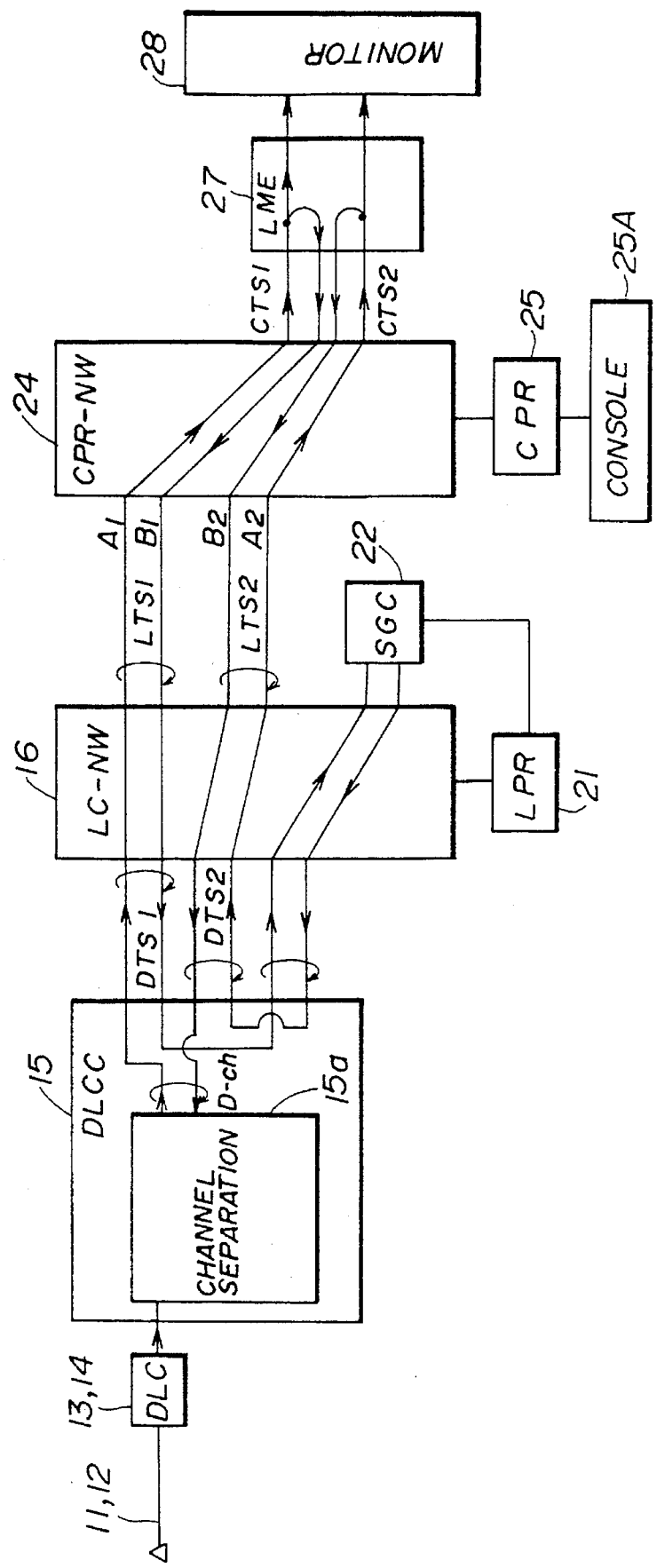
FIG. 3 is a block diagram of a multiple connection by a digital line circuit controller.

FIG. 3 shows a structure of a multiple connection realized by the DLCC 15. The structure shown in FIG. 3 makes it possible to monitor the D and B channels related to the basic interface subscribers. FIG. 3 shows a connection which is made when the D channel is monitored.

Figure 4:
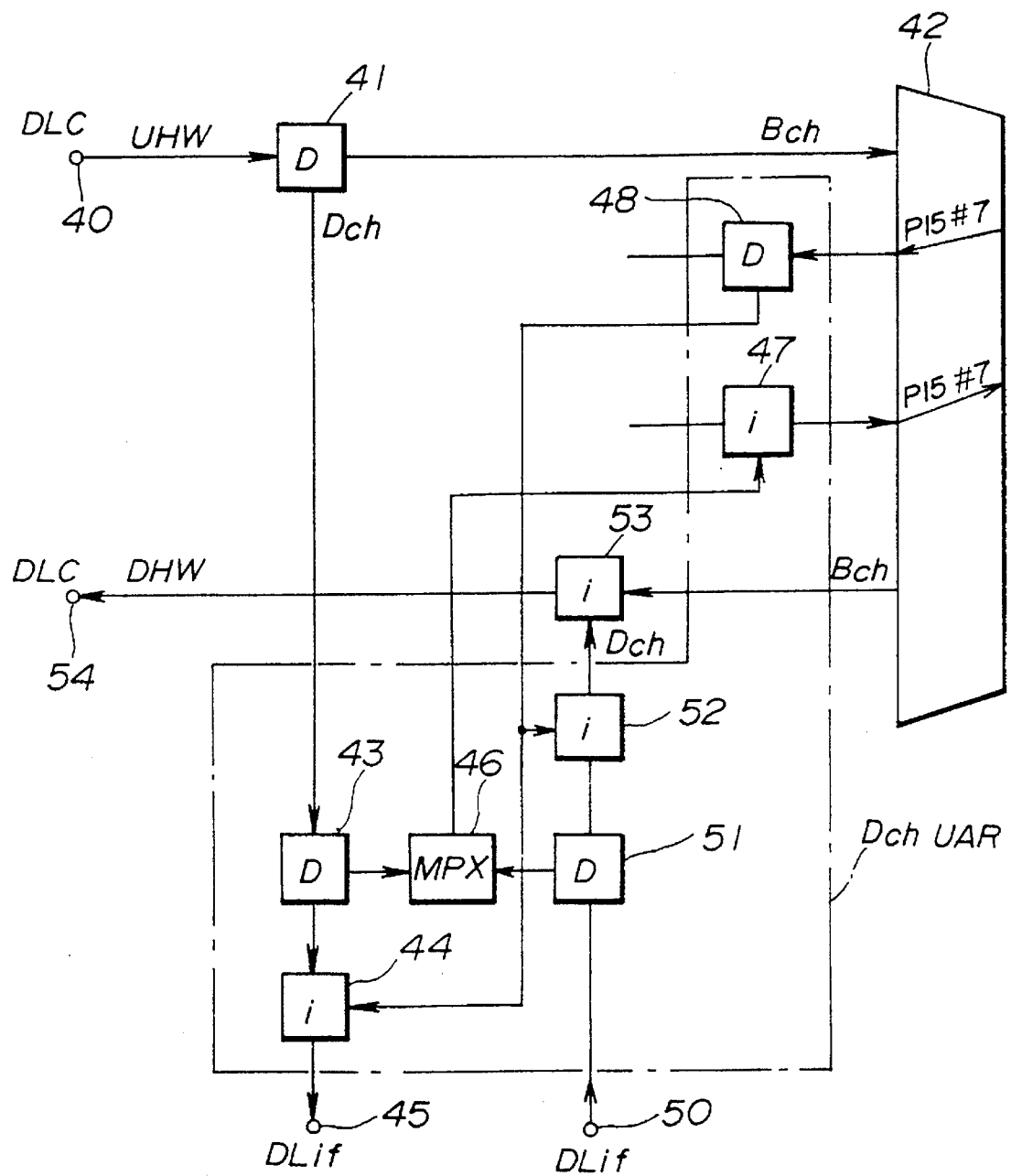
FIG. 4A is a block diagram of a connection which is made by the digital line circuit controller when a D channel is monitored.
FIG. 4B is a block diagram of showing how bits related to the D channels are located.

FIG. 4A shows an internal connection of the DLCC 15 which is made when the D channel is monitored. The time slots are supplied to a dropper (D) 41 via an up highway of the DLC 13 and a terminal 40, the dropper 41 separating the B-channel time slots and the D-channel time slots from each other. The separated B-channel time slots are input to a switch 42. Meanwhile, the separated D-channel time slots are input to the LC-NW 16 via dropper 43, an inserter 44 and a terminal 45, and then input to the SGC 22. During the monitor operation, the D-channel time slots are output to the LC-NW 16 via the dropper 43, a multiplexer (MPX) 46, an inserter 47 and the switch 42, and the D-channel time slots loop-backed by the LME 27 and supplied to a dropper 48 via the switch 42 are separated from the B-channel time slots by the dropper 48, and are inserted into time slots output to the terminal 45 by the inserter 44.

Down D-channel time slots from the SGC 22 are input to a terminal 50, and supplied to an inserter 53 via a dropper 51 and an inserter 52. The inserter 53 multiplexes the received D-channel time slots with the B-channel time slots from the switch 42. Then, the multiplexed time slots are sent to a down highway of the DLC 13. During the monitoring operation, the D-channel time slots are supplied to the LME 27 via the dropper 51, the multiplexer 46, the inserter 47 and the switch 42, and the D-channel time slots loop-backed by the LME 27 are supplied to the inserter 53 via the dropper 48 and the inserter 52.

The bit rate at each of the terminals 40 and 54 is equal to 64 kbps, while the bit rate at each of the terminals 45 and 50 is equal to 16 kbps. Thus, as shown in FIG. 4B, the D-channel time slots are formed so that two bits related to the down highway are accommodated in the first and fifth bit positions and two bits related to the up highway are accommodated in the second and sixth bit positions.

Figure 5:
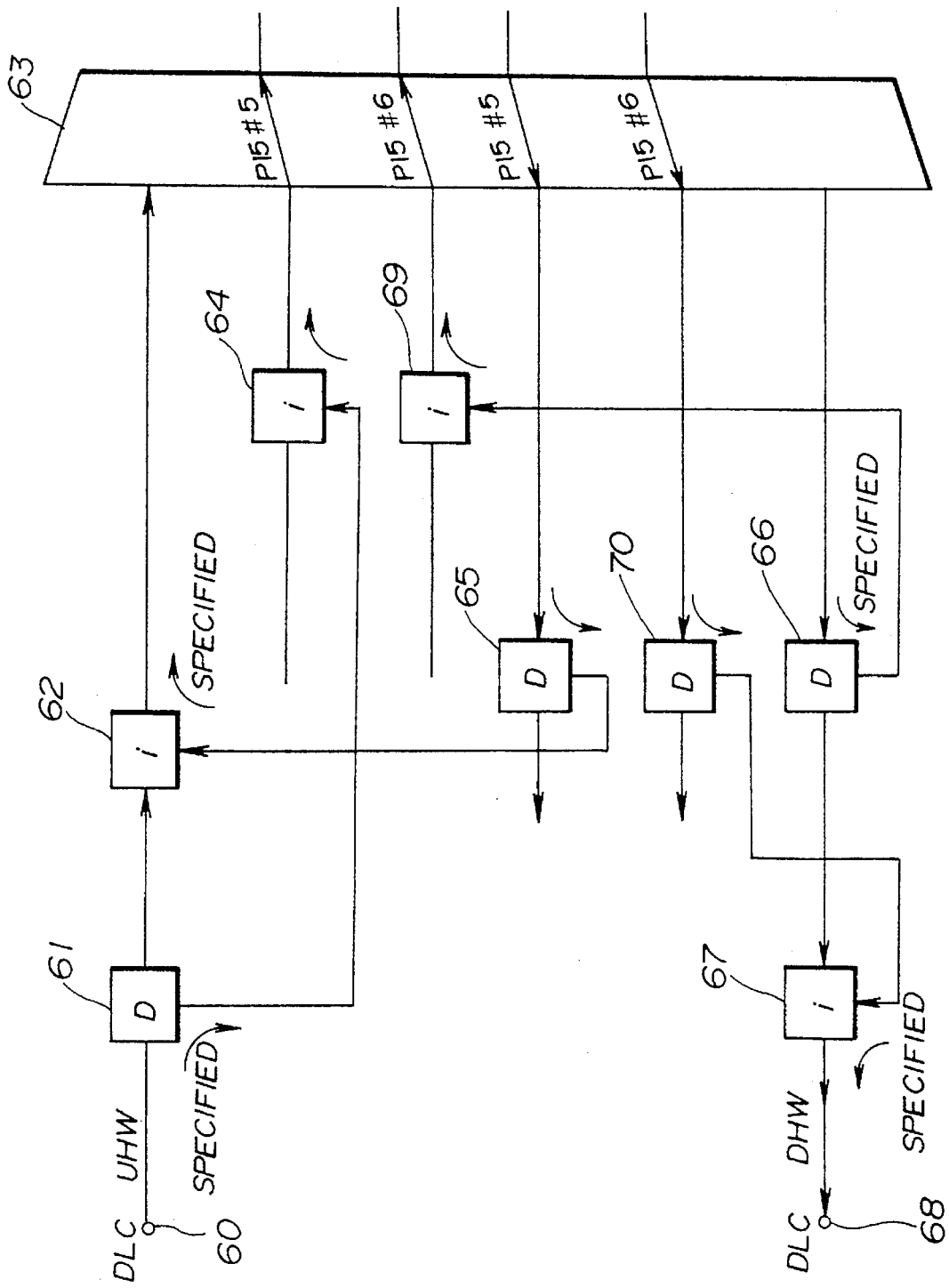
FIG. 5 is a block diagram of a connection which is made by the digital line circuit controller when a D channel is monitored.

The DLCC 15 makes a connection shown in FIG. 5 while the B channels are being monitored. Time slots input to a terminal 60 via the up-highway of the DLC 13 are supplied to a switch 63 via a dropper 61 and an inserter 62. Time slots related to a specified subscriber to be monitored are separated by the dropper 61 and are output to the LC-NW 16 via an inserter 64 and the switch 63. Then, specified time slots which are loop-backed by the LME 27 and input to the switch 63 are separated by a dropper 65 and multiplexed with the B-channel time slots directed to the switch 63 by the inserter 62.

Time slots supplied from the switch 63 via the down highway are sent to the down line of the DLC 13 via a dropper 66, an inserter 67 and a terminal 68. Time slots of the specified channel in the down direction are separated at the dropper 66, and output to the LC-NW 16 via an inserter 69 and the switch 63. The specified time slots loop-backed by the LME 27 are separated by a dropper 70, and multiplexed with the B-channel time slots sent via the terminal 68.

Returning now to FIG. 3, a maintenance operator inputs, to the CPR 25 via a console (input device) 25A, a command which specifies an accommodated location of a subscriber to be monitored and a channel number thereof and further specifies an accommodated position of the monitor equipment 28. In response to this command, the CPR 25 hunts idle time slots LTS1 and LTS2, and supplies, via the LC-NW 16, the LPR 21 with a connection request message which specifies the time slots LTS1, LTS2, DTS1 and DTS2. The time slots DTS1 and DTS2 are special time slots for supplying the contents of the specified channels respectively in the up and down highways specified by the DLCC 15 to the LC-NW 16.

The CPR 25 specifies the time slots CTS1 and CTS2 corresponding to the monitor accommodated position specified by the command, and controls the CPR-NW 24 so that the time slots LTS1 and CTS1 are connected to each other in two ways and the time slots LTS2 and CTS2 are connected to each other in two ways.

Figure 6:
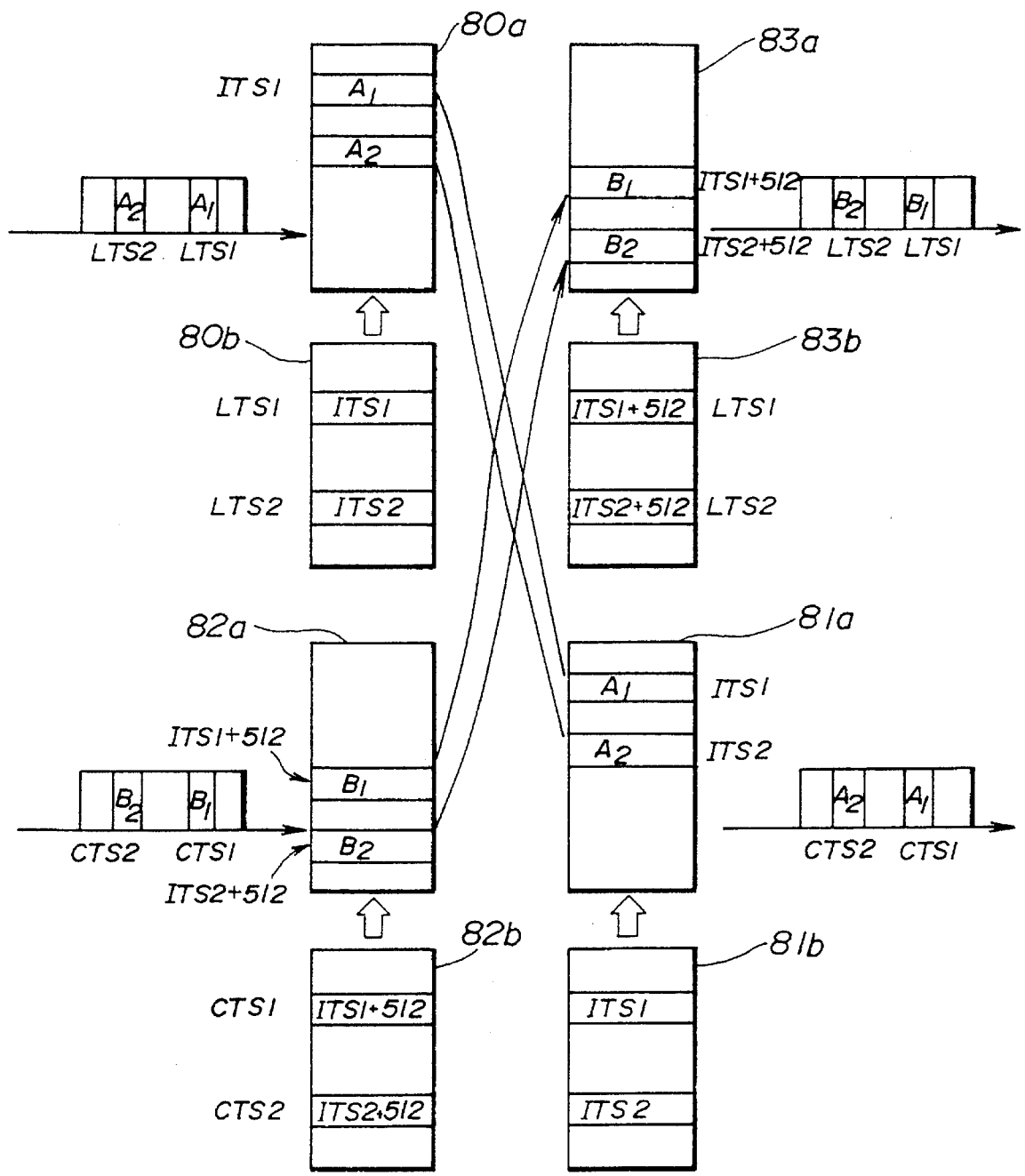
FIG. 6 is a block diagram of a connection which is made by a network controlled by a call processor.

Referring to FIG. 6, the contents A1 and A2 of the time slots LTS1 and LTS2 supplied from the LC-NW 16 are written into a primary time switch memory 80a. Each time slot is written into the primary time switch memory 80a in a random write way, and read out therefrom in a sequential read way. A control memory 80b specifies write timings at which the time slots are written into the primary time switch memory 80a at random. Each time slot read out from the primary time switch memory 80a is written into a secondary time switch memory 81a. Each time slot is written into the secondary time switch memory 81a in the sequential writing way, and read out therefrom in the random read way. A control memory 81b specifies read timings at which the time slots are read out from the secondary time switch memory 81a at random. By the above-mentioned write/read operation, the time slots CTS1 and CTS2 output to the LME 27 have data A1 and A2, respectively.

The contents B1 and B2 of the time slots CTS1 and CTS2 supplied from the LME 27 are written into a primary time switch memory 82a. Each time slot is written into the time switch memory 82a in the random write way and read out therefrom at the sequential read way. A control memory 82b specifies write timings at which the time slots are written into the primary time switch memory 82a at random. Each time slot read out from the primary time switch memory 82a is written into a secondary time switch memory 83a, which operates in the sequential write/random read way. A control memory 83b specifies read timings at which the time slot are read out from the secondary time switch memory 83a. By the above-mentioned write/read operation, the time slots CTS1 and CTS2 sent to the LC-NW 16 have data B1 and B2, respectively.

Figure 7:
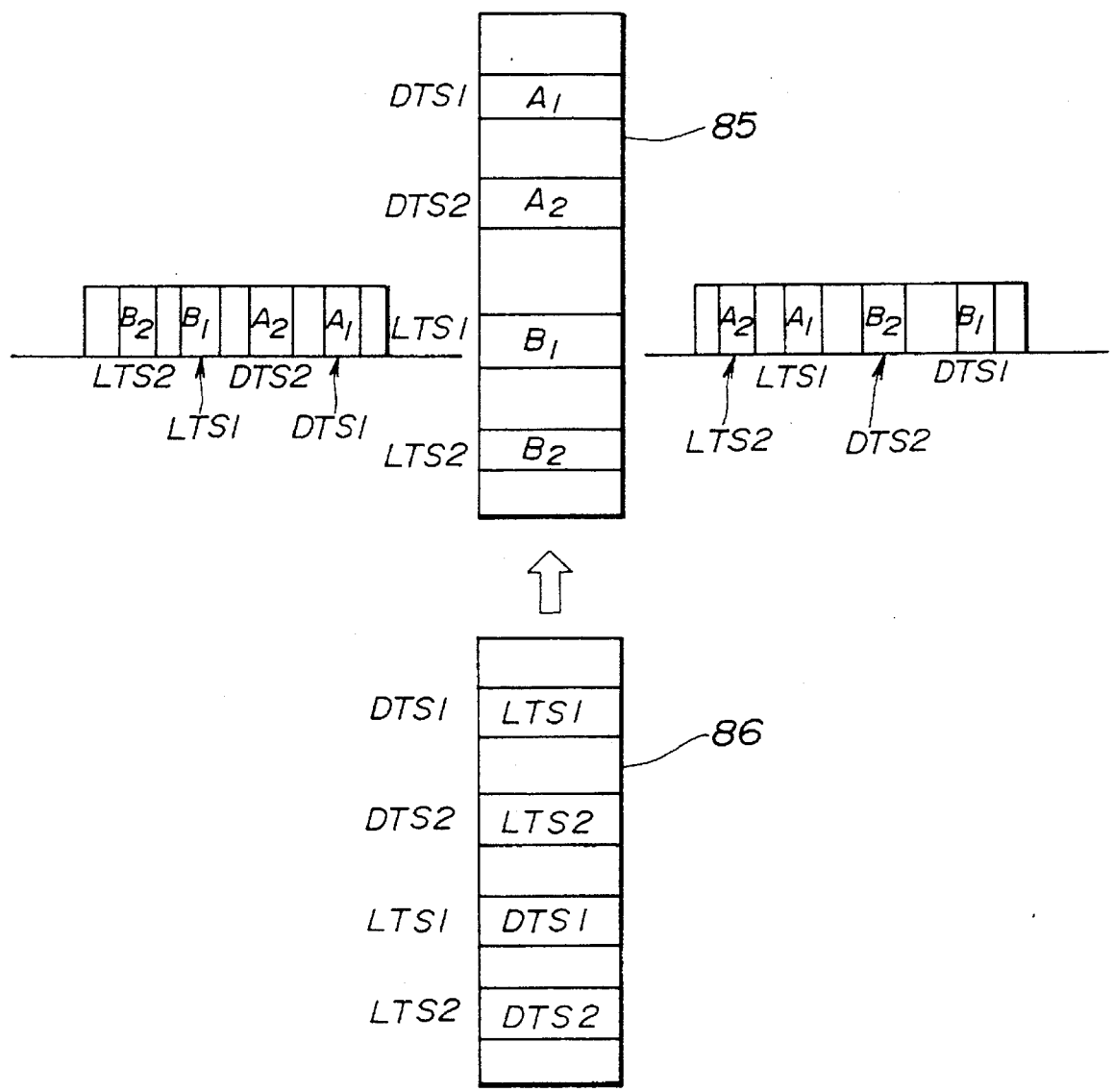
FIG. 7 is a block diagram of a connection which is made by a line circuit network.

The LPR 21 controls the LC-NW 16 in accordance with the connection request message so that, as shown in FIG. 7, the time slots LTS1 and DTS1 are mutually connected in the two ways and the time slots LTS2 and DTS2 are mutually connected in the two ways. Then, an LC-NW connection answer message is sent back to the CPR 25 by the LPR 21.

The contents A1, A2, B1 and B2 of, respectively, the incoming time slots DTS1, DTS2, LTS1 and LTS2 are written into a time switch memory 85, which operates in the sequential write/random read way. Read timings of the time switch memory 85 are specified by a control memory 86, so that the contents of the time slots DTS1, DTS2, LTS1 and LTS2 become B1, B2, A1 and A2, respectively.

When the CPR 25 receives the LC-NW connection answer message, it outputs to the DLCC 15 a channel interruption request message having, as parameters, the accommodated position and channel number of the subscriber (terminal) to be monitored specified by the command.

Upon receiving the channel interruption request message, the DLCC 15 controls the switches thereof so that the contents of the specified channel are output to the special time slots DTS1 and DTS2 of the LC-NW 16, and thus the CPR 25 is informed of the channel interruption answer message. Thus, a bidirectional connection connecting the time slots DTS1-LTS1-CTS1 and a bidirectional connection connecting the time slots DTS2-LTS2-CTS2 are realized.

Upon receiving the channel interruption answer message, the CPR 25 recognizes that the contents of the D channels respectively in the up and down highways have been sent to the monitor equipment 28, and informs the maintenance operator of this fact, as a self-control message.

If the B-channel monitor connection is made in a state where there is no call during the above-mentioned operation and a call which is generated by the subscriber to be monitored or received occurs, the LPR 21 allocates the B channel of the subscriber to be monitored to the call.

The above-mentioned first preferred embodiment of the present invention uses the switches for dropping the contents of the channel. If the dropping of the contents of the channel does not need the switching of a connection by means of the switches, the above-mentioned two-way connections can be replaced by one-way connections.

The first embodiment of the present invention will now be described again in brief. The contents of the specified channel of the subscriber to be monitored are output to the up-highway time slot DTS1 and the down-highway time slot DTS2. The time slots DTS1 and DTS2 are respectively connected to the idle time slots LTS1 and LTS2 in the two ways by the LC-NW 16. The time slots LTS1 and LTS2 are respectively connected to the time slots CTS1 and CTS2 corresponding to the monitor equipment accommodated position by the CPR-NW 24. Thus, the monitor equipment 28 can monitor the D and B channels of the subscriber being considered without stopping the exchange services.

Figure 8A:
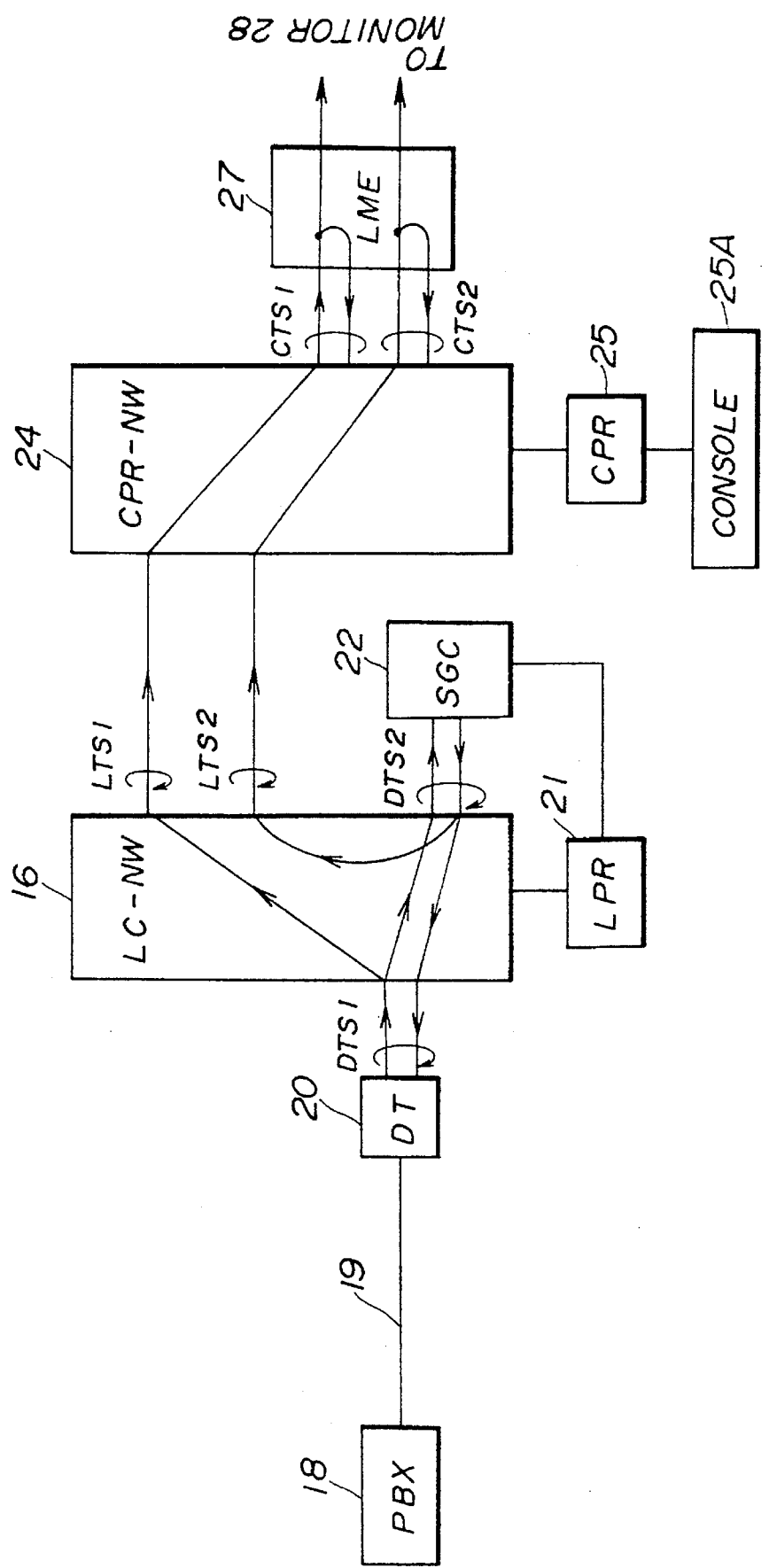
FIG. 8A is a block diagram of a multiple connection which is made by the line circuit network when a D channel is monitored according to a second preferred embodiment of the present invention.
Figure 8B:
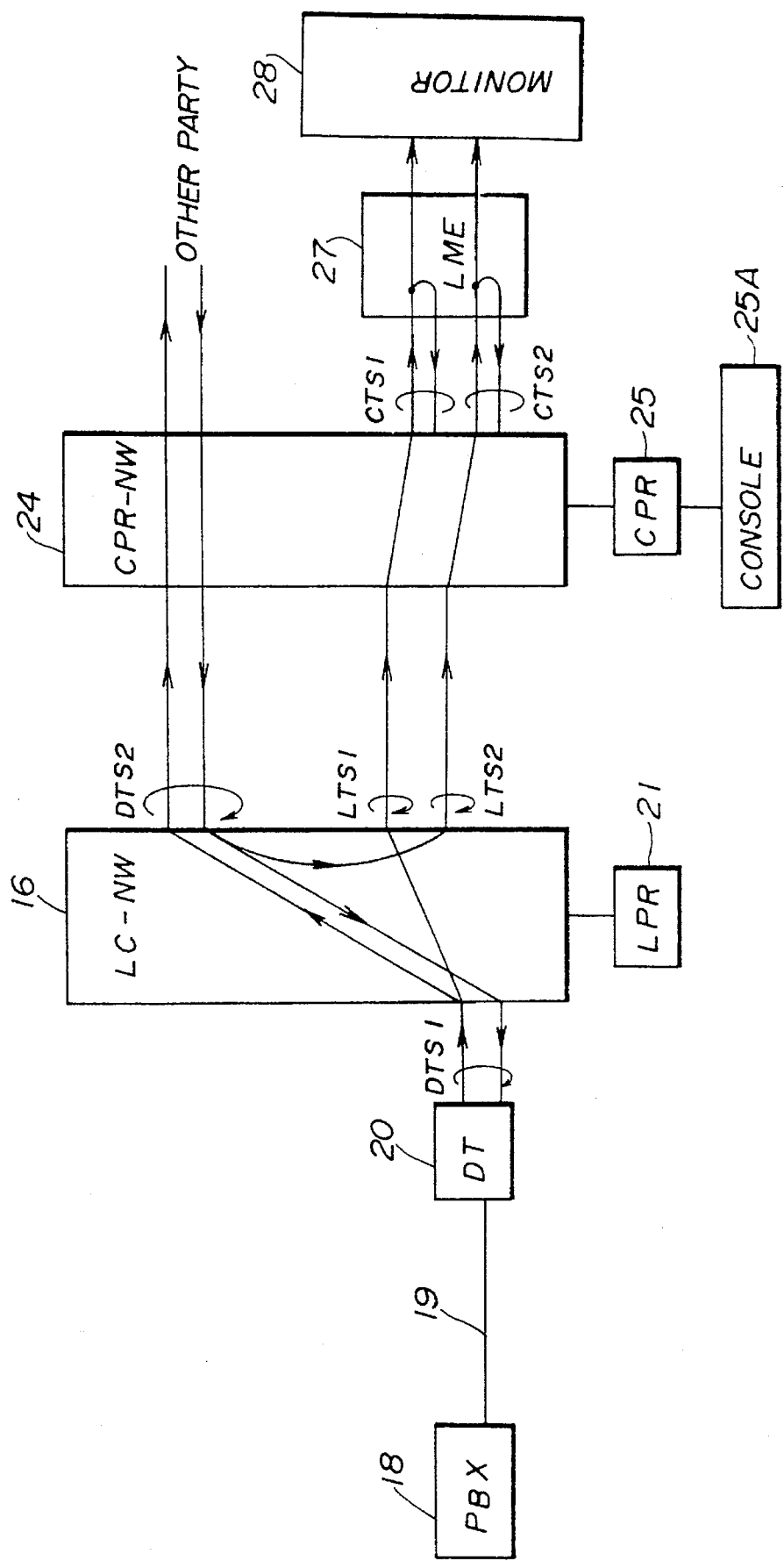
FIG. 8B is a block diagram of a multiple connection which is made by the line circuit network when a B channel is monitored according to the second preferred embodiment of the present invention.

A description will now be given of a second preferred embodiment of the present invention. FIGS. 8A and 8B show a multiple connection using a line circuit network LC-NW according to the second preferred embodiment of the present invention. According to the second embodiment, it is possible to monitor the B channels of the subscribers in conformity with the basic interface as well as the D and B channels of subscribers in conformity with the primary rate interface 19 (23B+D or 30B+D). FIG. 8A shows a connection which is made when the D channel of a subscriber in conformity with the primary rate interface 19 is monitored. FIG. 8B shows a connection which is made when the B channel of a subscriber in conformity with the primary rate interface 19 is monitored.

The maintenance operator inputs, to the CPR 25 via the console 25A, a command which specifies the accommodated position and channel identification number of a subscriber to be monitored and the accommodated position of the monitor equipment 28.

The CPR 25 hunts idle time slots LTS1 and LTS2 between the CPR 25 and the LPR 21, and sends to the LPR 21 an LC-NW multiple connection request message which has, as parameters, the accommodated position and channel number of the subscriber to be monitored. Further, the CPR 25 identifies time slots CTS1 and CTS2 of the CPR-NW 24 from the accommodated position of the monitor equipment 28 specified by the command. Then, as shown in FIG. 9, the CPR 25 mutually connects the time slots LTS1 and CTS1 in the one way, and mutually connects the time slots LTS2 and CTS2 in the one way.

Figure 9:
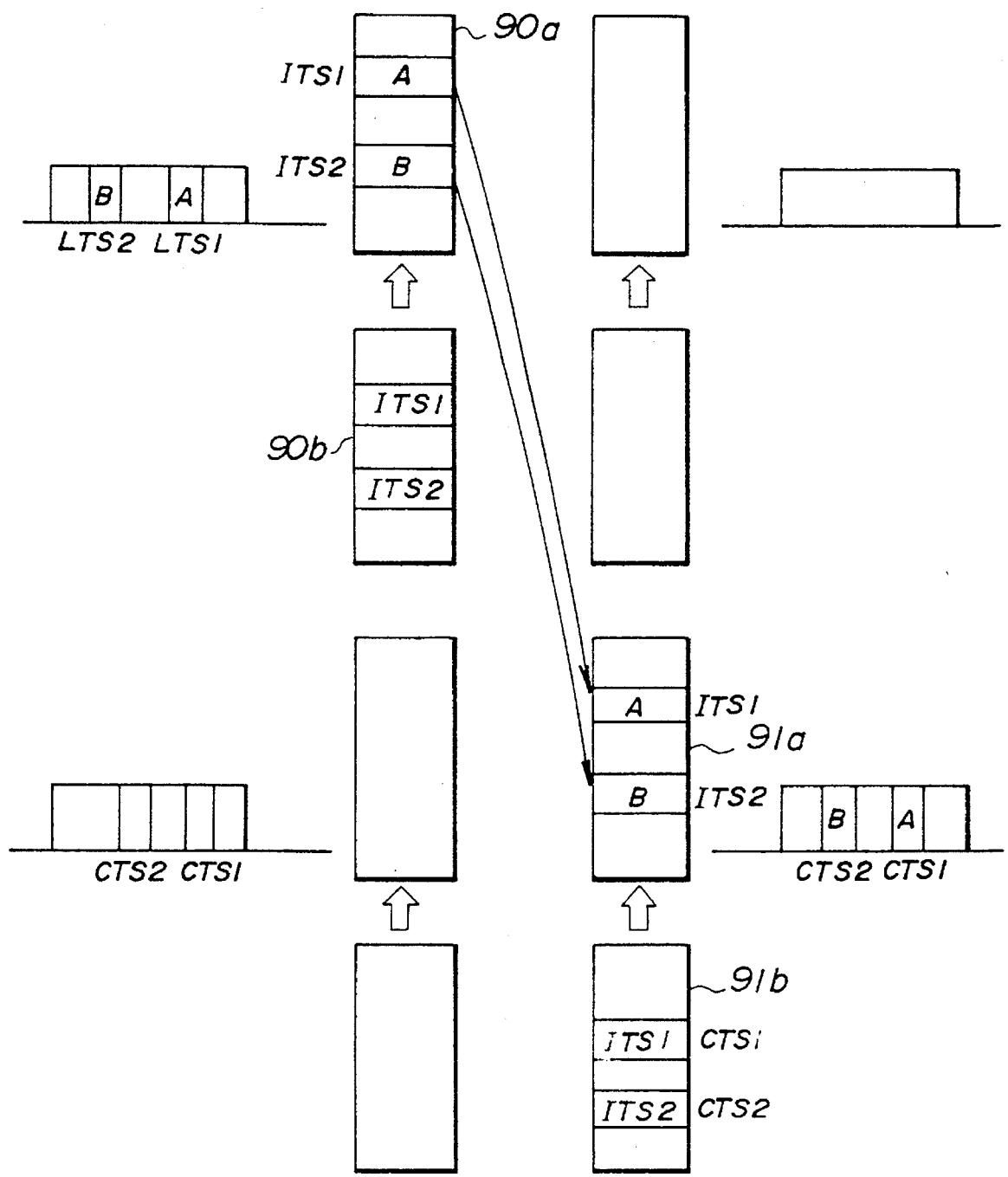
FIG. 9 is a block diagram of a connection which is made by the network controlled by the call processor.

In FIG. 9, the contents A and B of the respective time slots LTS1 and LTS2 received from the LC-NW 16 are written into a primary time switch memory 90a, which operates in the random write/sequential read way. Write timings of the primary time switch memory 90a are specified by a control memory 90b. Each time slot read out from the primary time switch memory 90a is written into a secondary time switch memory 91a, which operates in the sequential write/random read way. Read timings of the secondary time switch memory 91a are specified by a control memory 91b. Thereby, the time slots CTS1 and CTS2 to be sent to the LME 27 have data A and B, respectively.

The LPR 21 receives the LC-NW multiple connection request message from the CPR 25, and selects the time slots DTS1 and DTS2 as follows. When the D channel is monitored, the LPR 21 determines a time slot from the DT 20 corresponding to the D channel to be monitored to be time slot DTS1 and determines a time slot used for supplying the D channel to be monitored to the SGC 22 to be time slot DTS2.

When there is a call in the case where the B channel is monitored, the LPR 21 determines a time slot from the DT 20 corresponding to the B channel to be monitored to be time slot DTS1 and determines a time slot between the CPR 25 and the LPR 16 used by the call to be time slot DTS2. On the other hand, when there is no call, the CPR 21 determines the time slot from the DT 20 corresponding to the B channel to be time slot DTS1 and determines an idle time slot between the CPR 25 and the LPR 21 to be time slot DTS2.

Figure 10:
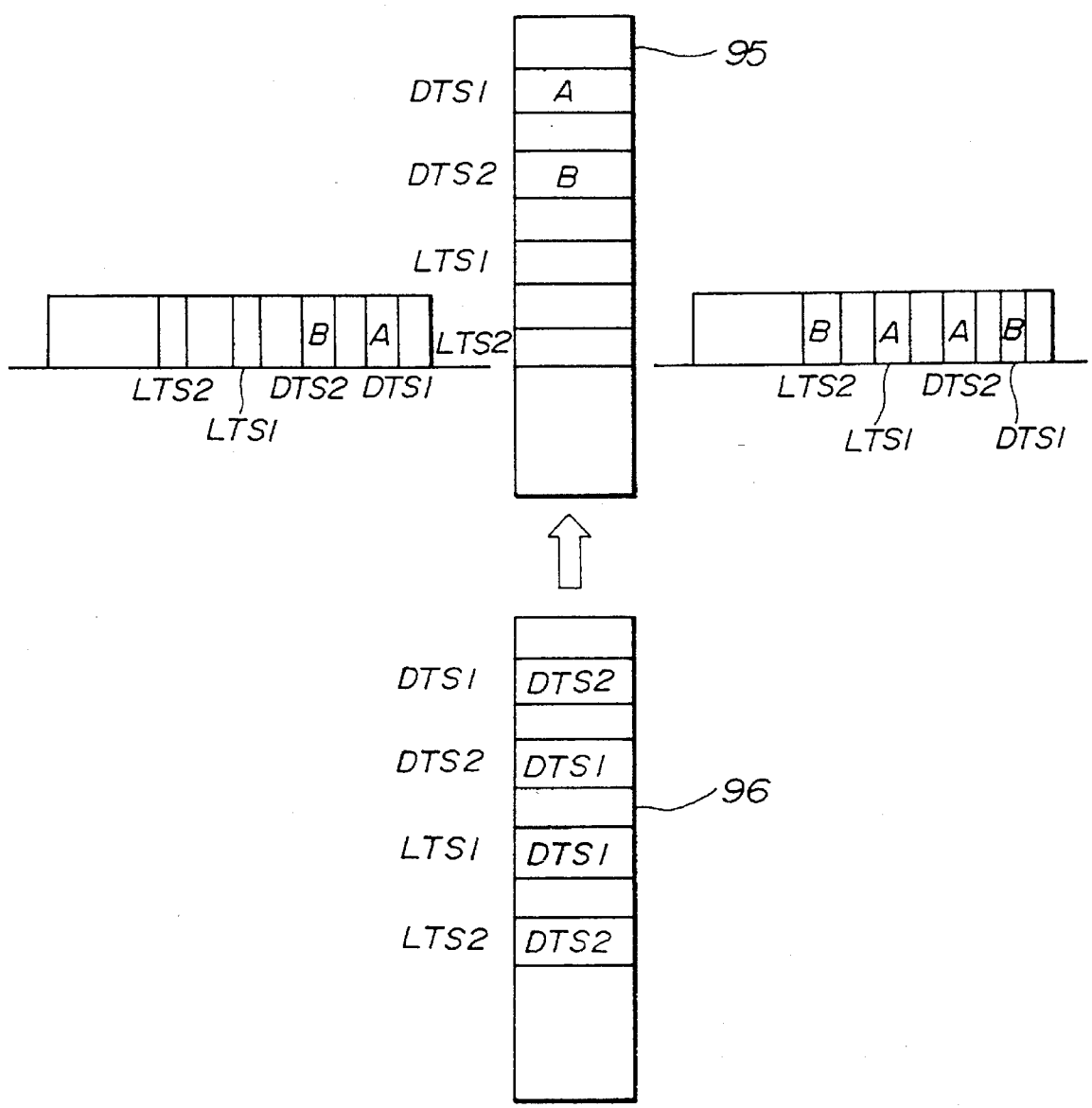
FIG. 10 is a block diagram of a connection which is made by the line circuit network.

After this, the LPR 21 controls the LC-NW 16 so that, as shown in FIG. 10, the time slots DTS1 and DTS2 are mutually connected in the two ways, the time slots DTS1 and LTS1 are connected in the one way, and the time slots DTS2 and LTS2 are connected in the one way. Thereby, an LC-NW connection answer message is sent back to the CPR 25.

In FIG. 10, the contents A and B of the respective incoming time slots DTS1 and DTS2 are written into a time switch memory 95, which operates in the sequential write/random read way. Read timings of the time switch memory 95 are specified by a control memory 96. In this way, the time slots DTS1, DTS2, LTS1 and LTS2 have data B, A, A and B, respectively.

By receiving the LC-NW multiple connection answer message from the LPR 21, the CPR 25 recognizes that the contents of the D channel in the up and down highways have been sent to the monitor equipment 28, and informs the maintenance operator of this fact as a self-control message.

If the B-channel monitor connection is made in a state where there is no call during the above-mentioned operation and a call which is generated by the subscriber to be monitored or received occurs, the LPR 21 makes the connection shown in FIG. 8B so that the call uses the B channel of the subscriber to be monitored and the above-mentioned time slot DTS2.

The second embodiment of the present invention will now be described again in brief. The LC-NW 16 connects the time slot DTS1 corresponding to the specified channel of the subscriber to be monitored to the idle time slot LTS1, and connects the time slot DTS2 normally used to the idle time slot LTS2. Further, using the CPR-NW 24, the time slots LTS1 and LTS2 are respectively connected to the time slots CTS1 and CTS2 corresponding to the accommodated position of the monitor equipment 28. In this way, the contents of the time slots DTS1 and DTS2 can be accommodated in the monitor equipment 28. As a result, it is possible to monitor the B channel in conformity with the basic interface and the D and B channels in conformity with the primary rate interface.

Figure 11:
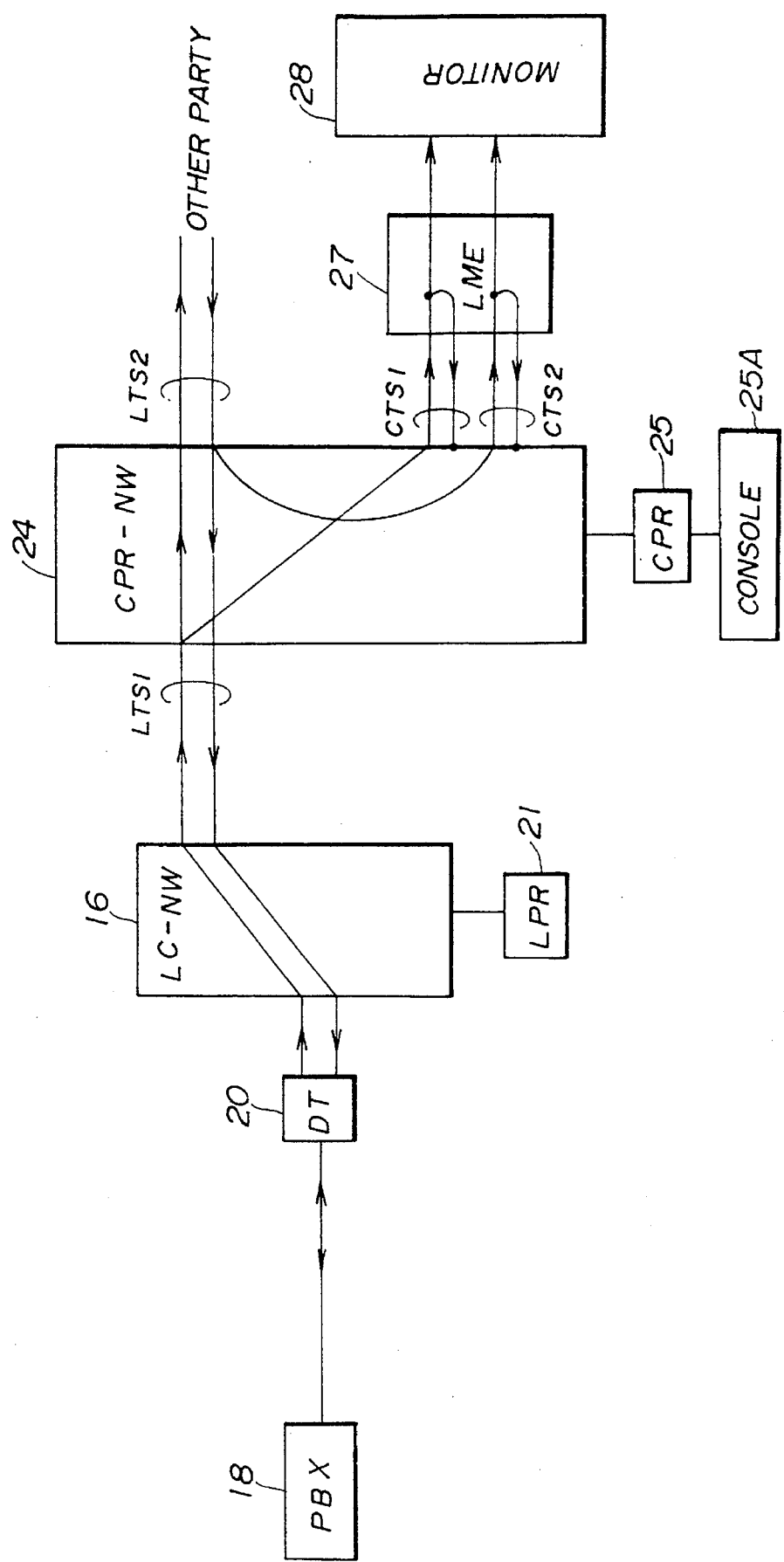
FIG. 11 is a block diagram of a multiple connection which is made by the network controlled by the call processor according to a third preferred embodiment of the present invention.

A description will now be given of a third preferred embodiment of the present invention. FIG. 11 shows a multiple connection realized by the CPR-NW according to the third preferred embodiment of the present invention. According to the third embodiment, it is possible to monitor the B channel in a case where there is a subscriber call which conforms to the basic interface and the primary rate interface.

The maintenance operator inputs, to the CPR 25 via the console 25A, a command which shows the accommodated position and channel number of a subscriber to be monitored and the accommodated position of the monitor equipment 28.

The CPR 25 determines whether or not there is a call using the specified channel, determines the time slot between the CPR 25 and the LPR 21 used by the call to be LTS1, and determines the time slot between the CPR 25 and ISDN 26 used by the call to be LTS2. Then, the CPR 25 identifies the corresponding time slots CTS1 and CTS2 of the CPR-NW 24 from the accommodated position of the monitor equipment 28 specified by the command. Then, the CPR 25 controls the CPR-NW 24 so that, as shown in FIG. 12, the time slots LTS1 and LTS2 are mutually connected in the two ways, the time slots LTS1 and CTS1 are connected in the one way, and the time slots LTS2 and CTS2 are connected in the one way.

Figure 12:
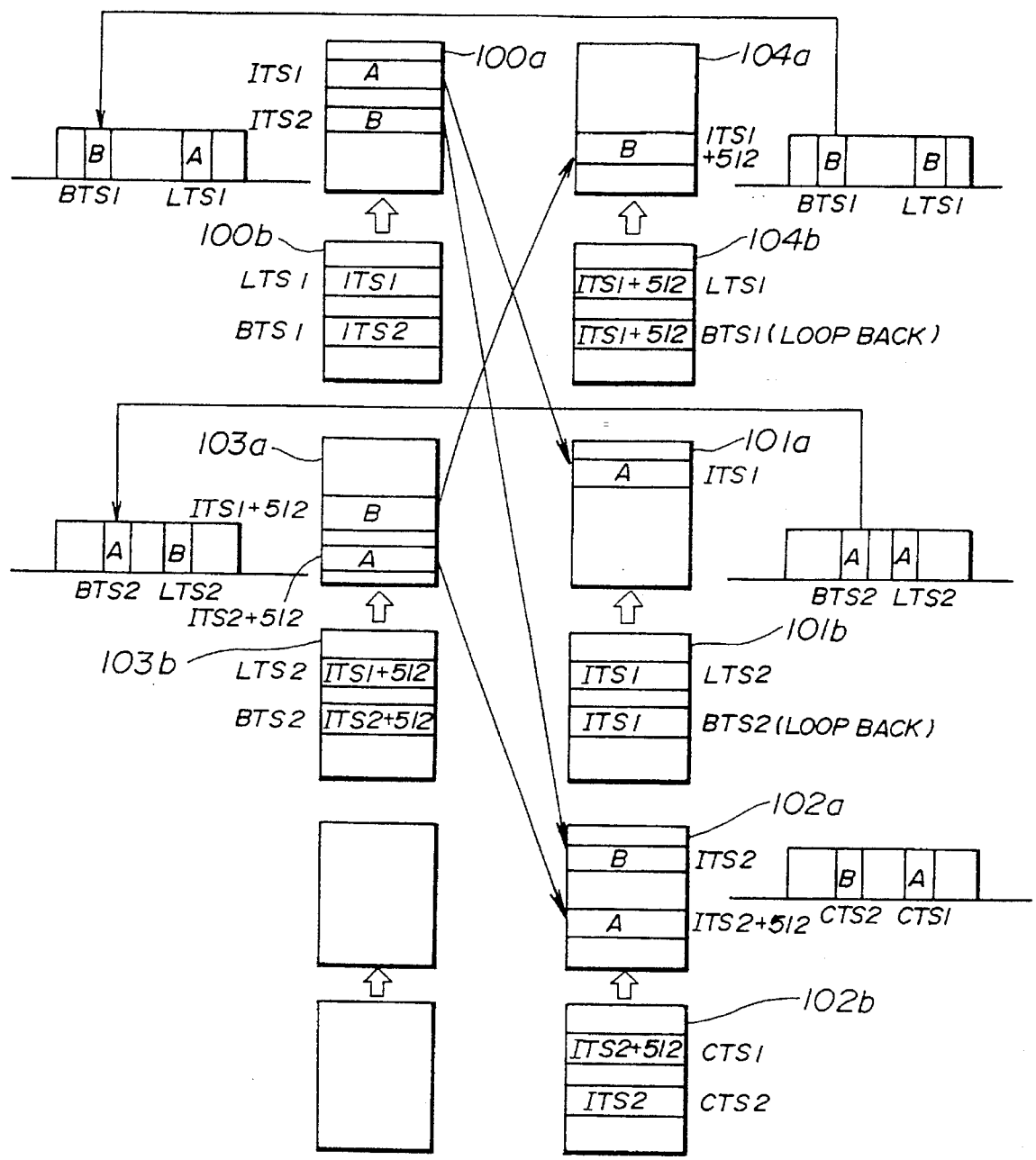
FIG. 12 is a block diagram of a connection which is made by the network controlled by the call processor.

In FIG. 12, the content A of the time slot from the LC-NW 16 and the content B of the loop-backed time slot BTS1 are written into a primary time switch memory 100a, which operates in the random write/sequential read way. Write timings of the primary time switch memory 100a are specified by a control memory 100b. Each time slot read out from the primary time switch memory 100a is written into secondary time switch memories 101a and 102a, each of which operates in the sequential write/random read way. Read timings of the secondary time switch memories 101a and 102a are specified by control memories 101b and 102b, respectively. The control memory 101b is so instructed that the time slot BTS2 is loop-backed to a primary time switch memory 103a. Thus, the time slots LTS2 and BTS2 sent to the secondary time switch memory 101a have data A and A, respectively, and the time slot CTS1 sent to the secondary time switch memory 102a has data A.

The content A of the time slot from the ISDN 26 and the content B of the loop-backed time slot BTS2 are written into the primary time switch memory 103a, which operates in the random write/sequential read way. Write timings of the primary time switch memory 103a are specified by a control memory 103b. Each time slot read out from the primary time switch memory 103a is written into secondary time switch memories 104a and 102a. The secondary time switch memory 104a operates in the sequential write/random read way, and read timings thereof are specified by a control memory 104b. Further, the control memory 104b is specified so that the time slot BTS1 is loop-backed to the primary time switch memory 100a. Thereby, the time slots LTS1 and BTS1 sent out to the ISDN 26 from the primary time switch memory 104a have data A and A, and the content of the time slot CTS2 sent to the LME 27 from the secondary time switch memory 102a has data B.

The CPR 25 recognizes that the contents of the D channel in the up and down highways have been sent to the monitor equipment 28, and informs the maintenance operator of this fact, as a self-control message.

As described above, according to the third embodiment of the present invention, the time slots LTS1 and LTS2 of the LC-NW 16 and ISDN 26 are connected to the time slots CTS1 and CTS2 corresponding to the accommodated positions of the monitor equipment 28, so that the contents of the time slots LTS1 and LTS2 are stored in the monitor equipment 28. With this arrangement, it becomes possible to monitor the B channel in which a call in conformity with the basic interface or the primary rate interface can be monitored without stopping the exchange services.

Figure 13:
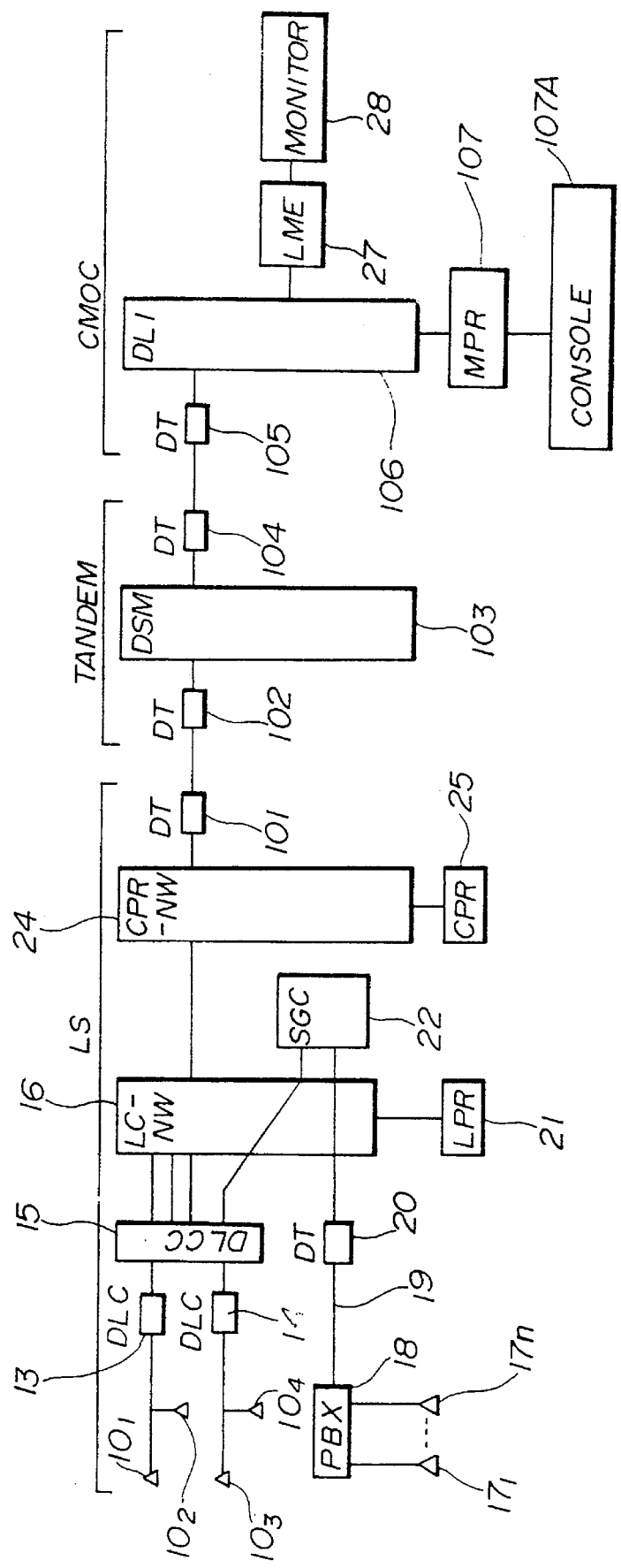
FIG. 13 is a block diagram of a fourth preferred embodiment of the present invention.

A description will now be given of a fourth preferred embodiment of the present invention. FIG. 13 shows the entire structure of the fourth embodiment of the present invention. In FIG. 13, those parts which are the same as those shown in the previously described figures are given the same reference numerals. A line switch LS is defined as shown in FIG. 13. More specifically, the line switch LS includes the structural elements $10_1$–$10_4$, 11–16, $17_1$–$17_n$, 18–26, and a digital trunk (DT) 101.

A tandem exchange (TANDEM) is composed of a digital trunk (DT) 102, a digital switching module (DSM) 103 and a digital trunk (DT) 104. The multiplexed time slots from the CPR-NW 24 are connected, via the DTs 101 and 102, to time slots of the DSM 103. A centralized maintenance and operation center (CMOC) is connected to the TANDEM. The CMOC is composed of a digital trunk (DT) 105, a digital link interface controller (DLI) 106, and a main system processor (MPR) 107. The aforementioned LME 27 to which the monitor equipment 28 is connected, is connected to the DLI 106. The time slots of the DSM 103 are connected, via the DTs 104 and 105, to time slots of the DLI 106. Under the control of the MPR 107, the time slots from the TANDEM are connected to the monitor equipment 28 via the LME 27. The terminals 30, 32, 33 and 35 shown in FIG. 2 are connected to the DLI 106, and the terminals 31 and 34 are connected to the monitor equipment 28.

Figure 14:
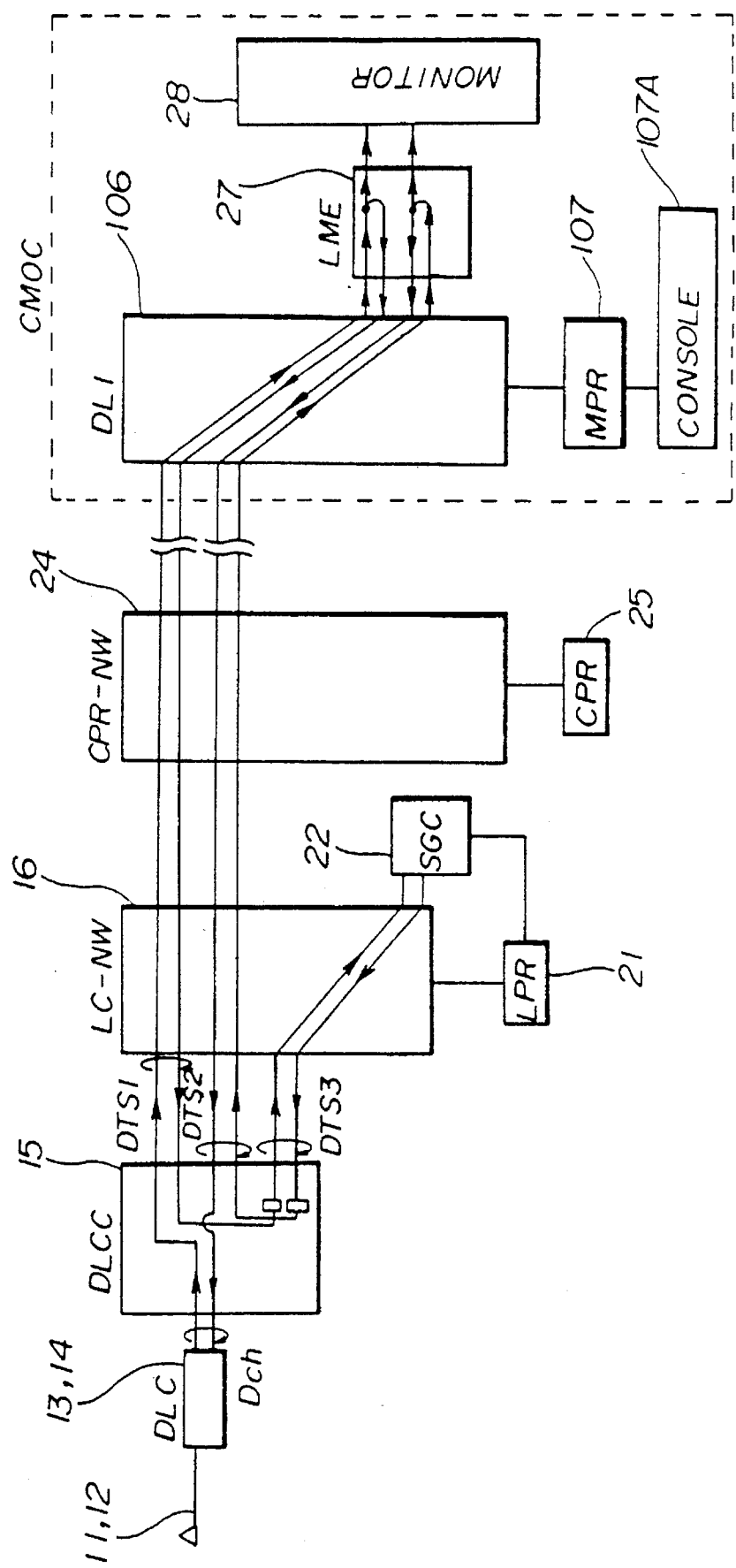
FIG. 14 is a block diagram of a multiple connection which is made by the digital line circuit controller.

FIG. 14 shows a multiple connection which is made by the DLCC 15 shown in FIG. 13. The multiple connection made by the DLCC 15 shown in FIG. 14 is the same as that shown in FIG. 3.

Figure 15:
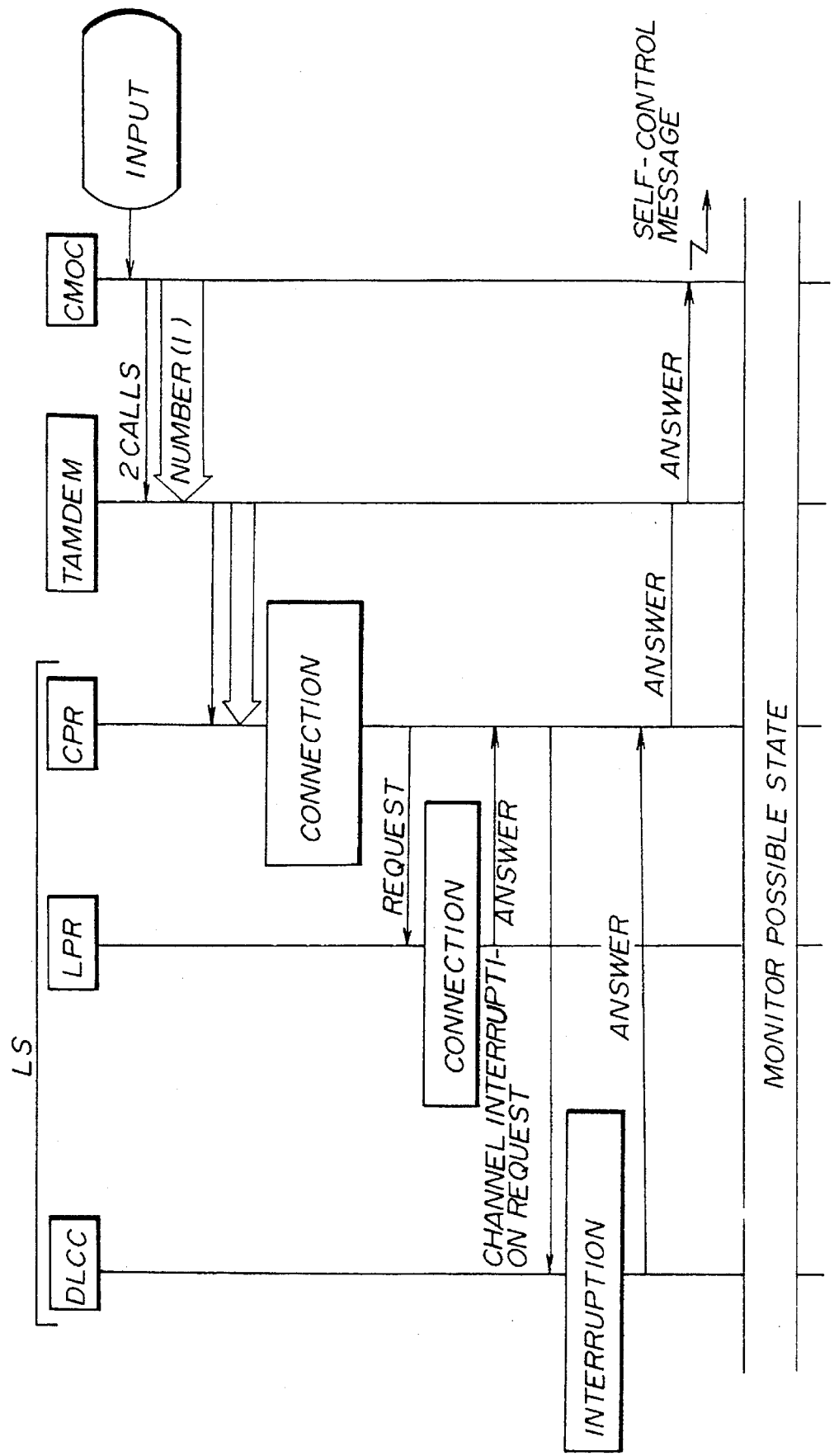
FIG. 15 is a sequence diagram showing the operation of the fourth preferred embodiment of the present invention.

A description will now be given of a monitoring procedure of the fourth embodiment of the present invention with reference to FIG. 15 in addition to FIG. 14. A command is input to the MPR 107 via a console 107A. This command has information about the office number of an office in which a subscriber to be monitored is accommodated, the accommodated position (telephone number) and channel number of the monitored subscriber, and the accommodated position of the monitor equipment 28. In response to this command, the MPR 107 analyzes the office number, and generates two special calls each having a number defined as follows:

$$\text{XXX+telephone number of the monitored subscriber+channel number} \quad (1)$$

where XXX denotes a number for discriminating the calls used for monitoring from other calls. One of the two calls is transferred in the up-highway of a monitor line, and the other call is transferred in the down-highway thereof. The monitor line, which connects the CMOC, the TANDEM and each LS, is specifically used for monitoring. That is, only the calls for use in monitoring are allowed to pass through the monitor line.

The DSM 103 translates the number defined by the above formula (1) and establishes a path. Finally, the two calls terminate at the LS in which the monitored subscriber is accommodated. The LS translates the received number and identifies the telephone number and channel number of the monitored subscriber. The CPR 25 related to the monitored subscriber hunts two idle time slots LTS1 and LTS2 between the CPR 25 and the LPR 21, and sends to the LPR 21 the LC-NW connection request message having, as parameters, the time slots LTS1, LTS2, DTS1 and DTS2. The time slots DTS1 and DTS2 are special time slots used for outputting the contents of the specified channel in the up and down highways by the DLCC 15. The CPR 25 related to the monitored subscriber identifies the special time slots from the telephone number and channel number of the monitored subscriber specified by the command. Then, the CPR 25 connects the time slots LTS1 and CTS1 to each other in the two ways, and connects the time slots LTS2 and CTS2 to each other in the two ways, as shown in FIGS. 6 and 14.

In accordance with the LC-NW connection request message from the CPR 25, the LPR 21 controls the LC-NW 16 so that the time slots LTS1 and DTS1 are mutually connected in the two ways and the time slots LTS2 and DTS2 are mutually connected in the two ways, as shown in FIG. 7. Then, the LPR 21 returns the LC-NW connection answer message to the CPR 25.

Upon receiving the LC-NW connection answer message, the CPR 25 related to the monitored subscriber sends to the DLCC 15 the channel interrupt request message having, as parameters, the specified accommodated position and channel number of the monitored subscriber. Upon receiving the channel interruption request message from the CPR 25, the DLCC 15 controls the switches provided therein so that the contents of the specified channel are output to the special time slots DTS1 and DTS2 of the LC-NW16, as shown in FIG. 4A and FIG. 5, so that the CPR 25 is informed of the channel interruption answer message. In the above-mentioned way, the bidirectional connections DTS1-LTS1-CTS1 and DTS2-LTS2-CTS2 are realized.

By receiving the channel interrupt request answer message, the CPR 25 related to the monitored subscriber recognizes that the monitor equipment 28 has been informed of the contents of the D channel in the up and down highways, and informs the maintenance operator of this fact as a self-control message. When the B-channel monitor connection is made in the state where there is no call and thereafter a call which terminates at the monitored terminal or which is generated thereby occurs, the LPR 21 operates so that the B channel to be monitored is allocated to the call.

As described above, according to the fourth preferred embodiment of the present invention, the contents of the specified channel of the subscriber to be monitored are output to the time slots DTS1 and DTS2 of the up and down highways. The time slots DTS1 and DTS2 are connected to the idle time slots LTS1 and LTS2 by means of the LC-NW 16, the time slots LTS1 and LTS2 being connected to the time slots CTS1 and CTS2 corresponding to the accommodated position of the monitor equipment 28 by means of the CPR-NW 24. With this arrangement, it becomes possible to store the contents of the specified channel of the monitored subscriber in the monitor equipment 28 without stopping the exchange services. In addition, it is possible to realize an unmanned maintenance operation for each ISDN exchange.

A description will now be given of a fifth preferred embodiment of the present invention with reference to FIGS. 16 and 17, in which those parts which are the same as those shown in the previously described figures are given the same reference numerals. According to the fifth embodiment, it is possible to monitor the B channel of the basic interface subscriber and the D and B channels of the subscriber in conformity with the primary rate interface 19. FIG. 16 shows a connection which is made when the D channel of the subscriber in conformity with the primary rate interface 19 is monitored. FIG. 17 shows a connection which is made when the B channel of the subscriber in conformity with the basic interface 11 or 12 or the primary rate interface 19 is monitored.

The maintenance operator inputs, via the console 107A, a command to the MPR 107 having, as parameters, the office number of the office in which the subscriber to be monitored is accommodated, the accommodated position and channel number of the monitored subscriber, and the accommodated position of the monitor equipment 28. The MPR 28 translates the office number, and sends the command to the exchange office in which the monitored subscriber is accommodated while a character chain of the command is maintained as it is. The received command is analyzed by the exchange office. It is noted that the command format sent from the CMOC to the exchange office in which the monitored subscriber is accommodated is shaped so that it is the same as that input by the exchange office in which the monitored subscriber is accommodated.

Then, the CMOC is connected to the exchange office in which the monitored subscriber is accommodated in the following way. Two connection paths are available. One of the paths uses a specifically used line specified by the command beforehand. The other path is made so that the exchange office generates a dummy call for making a connection between the exchange offices, and the monitored subscriber is connected, under the control of the CPR 25, to the network in which the monitored subscriber is accommodated.

The CPR 25 in which the monitored subscriber is accommodated hunts the idle time slots LTS1 and LTS2 between the CPR 25 and LPR 21, and sends to the LPR 21 the time slots LTS1 and LTS2 and the LC-NW multiple connection request message having, as parameters, the accommodated position and channel number of the monitored subscriber. Then, the MPR 107 identifies the two time slots CTS1 and CTS2 of the DLI 106 from the accommodated position of the monitor equipment 28 specified by the command. After that, the MPR 107 connects the time slots LTS1 and CTS1 in the one way and connects the time slots LTS2 and CTS2 in the one way by using, for example, the specifically used line connecting the CMOC and the exchange office in which the monitored subscriber is accommodated, as shown in FIG. 9.

Upon receiving the LC-NW multiple connection request message from the CPR 25, the LPR 21 determines the time slots DTS1 and DTS2 to be as follows. When the D channel is monitored, the time slot from the DT 20 corresponding to the D channel is determined to be time slot DTS1, and the time slot for supplying the D channel to be monitored to the SGC 22 is determined to be time slot DTS2. In the case where the B channel is monitored, if there is a call, the time slot from the DT 20 corresponding to the B channel to be monitored is determined to be DTS1, and the time slot between the CPR 25 and LPR 16 used by the call is determined to be DTS2. In the case where the B channel is monitored, if there is no call, the time slot from the DT 20 corresponding to the B channel to be monitored is determined to be DTS1, and an idle time slot between the CPR 25 and the LPR 21 is determined to be DTS2.

After that, as shown in FIG. 10, the LPR 21 controls the LC-NW 16 so that the time slots DTS1 and DTS2 are mutually connected in the two ways, the time slots DTS and LTS1 are connected in the one way, and the time slots DTS2 and LTS2 are connected in the one way. As a result of this arrangement, the LC-NW connection answer message is sent to the CPR 25.

Upon receiving the LC-NW connection answer message from the LPR 21, the CPR 25 related to the monitored subscriber recognizes that the monitor equipment 28 has been informed of the contents of the D channel in the up and down highways, and informs the maintenance operator of this fact as a self-control message. When the B-channel monitor connection is made in the state where there is no call and then a call which terminates at the monitored terminal or which is generated thereby occurs, the LPR 21 operates so that the B channel to be monitored is allocated to the call.

As described above, according to the fifth preferred embodiment of the present invention, the time slot DTS1 corresponding to the specified channel of the monitored subscriber and the time slot DTS2 normally connected are connected to the idle time slots LTS1 and LTS2, respectively. Further, the time slots LTS1 and LTS2 are connected to the time slots CTS1 and CTS2 corresponding to the accommodated position of the monitor equipment 28 by means of the DIL 106. Thus, it is possible to monitor the D and B channels of the base interface and those of the primary rate interface.

Figure 18A:
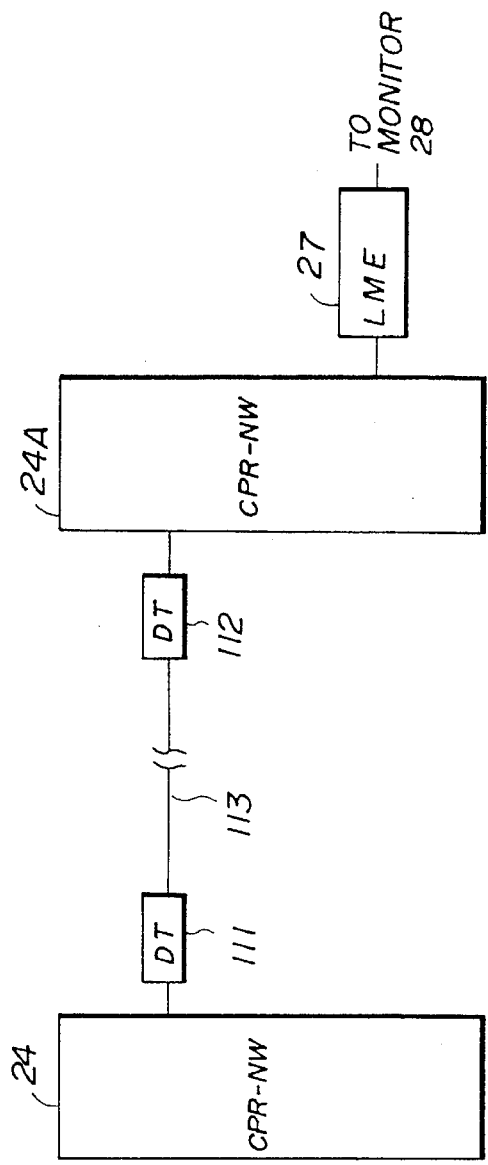
FIGS. 18A and 18B are block diagrams showing variations of the embodiments of the present invention.

As shown in FIG. 18, it is possible to connect the LME 27 and the monitor equipment 28 to a CPR-NW 24A, which is coupled to the CPR-NW 24 via digital trunks (DT) 111 and 112 and a transmission line 113 specifically used for the monitoring procedure.

Figure 18B:
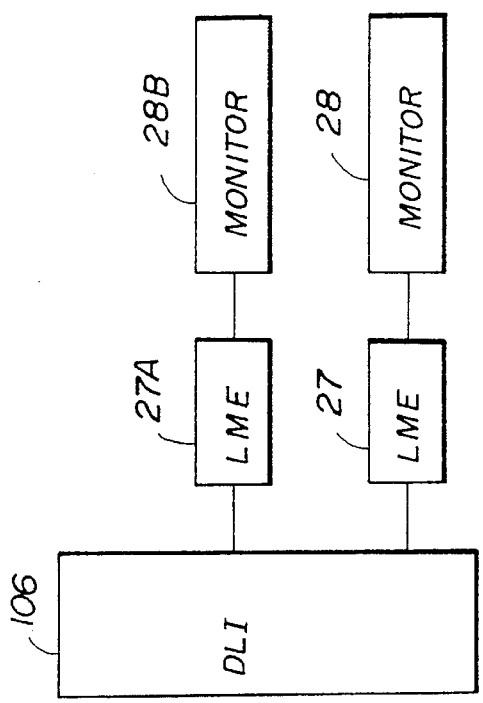

As shown in FIG. 18B, it is possible to provide an LME 27A and monitor equipment 28A in addition to the LME 27 and the monitor equipment 28. The aforementioned command, which is input via the console 25A or 107A, includes data indicating which one of the monitor equipments 28 and 28A should be used. It is also possible to provide more than two LMEs and more than monitor equipment units.

The present invention is not limited to the specifically disclosed embodiments, and variations and modifications may be made without departing from the scope of the present invention.

What is claimed is:

1. An ISDN line circuit channel monitor system having a digital line circuit controller which separates time slots carried by basic rate interface lines into a D channel and B channels and generates multiplexed time slots of the D channel and multiplexed time slots of the B channels, a first network receiving multiplexed time slots transmitted from said digital line circuit controller and a primary rate interface line, and a second network which switches time slots transmitted from said first network to said second network and which outputs switched multiplexed time slots to an ISDN, said ISDN line circuit channel monitor system, comprising:

monitor means, coupled to the digital line circuit controller via the first network and the second network, for monitoring said B channels and said D channel carried by said basic rate interface lines and said primary rate interface line; and connection means, coupled to said monitor means, for establishing a communication path to connect a terminal with said monitor means via the first network, the second network and the digital line circuit controller so that at least one of the time slots of the B channels and the D channel to be monitored is transmitted along the communication path.

2. An ISDN line circuit channel monitor system as claimed in claim 1, wherein:

said monitor means is coupled to said second network;

said time slots of said B and D channels carrying signals; and said connection means comprises:

first means, provided in said second network, for connecting first time slots and second time slots in two ways, said first time slots being transmitted between said monitor means and said second network, and said second time slots being transmitted between said first and second networks; and second means, provided in said first network, for connecting said second time slots and third time slots in two ways, said third time slots being transmitted between said first network and said digital line circuit controller.

3. An ISDN line circuit channel monitor system as claimed in claim 2, wherein said ISDN line circuit channel monitor system further comprises a signal controller which is coupled to said first network and which processes the signals of said time slots transmitted via the D channels, and wherein said connection means comprises third means for connecting said third time slots to said signal controller.

4. An ISDN line circuit channel monitor system as claimed in claim 1, wherein:

said monitor means is coupled to said second network;

said time slots of said B channels and said D channels carry signals;

said ISDN line circuit channel monitor system further comprises a signal controller which is coupled to said first network and which processes signals carried by the D channels; and said second network connecting first time slots and second time slots in two ways, said first time slots being transmitted between said monitor means and said second network, and said second time slots being transmitted between said first and second networks.

5. An ISDN line circuit channel monitor system as claimed in claim 1, wherein:

said monitor means is coupled to said second network;

said digital line circuit controller connects to said terminal, via one of said basic rate interface lines and said primary rate interface line;

said time slots of said B and D channels carry signals; and said connection means comprises:

means, provided in said first and second networks, for connecting first time slots from said digital line circuit controller to second time slots, transmitted between said first and second networks, and for connecting third-time slots, transmitted between said second network and said monitor means to the second time slots.

6. An ISDN line circuit channel monitor system as claimed in claim 1, wherein said ISDN line circuit channel monitor system further comprises input means, provided in said second network, for specifying at least one channel to be monitored.

7. An ISDN line circuit channel monitor system having a digital line circuit controller which separates time slots carried by a basic rate interface lines into a D channel and B channels and generates multiplexed time slots of D channel and multiplexed time slots of the B channels, a first network receiving multiplexed time slots transmitted from said digital line circuit controller and a primary rate interface line, and a second network which switches time slots transmitted from said first network to said second network, said ISDN line circuit channel monitor system, comprising:

a digital link interface coupled to said second network;

monitor means, connected to said digital link interface, for monitoring said D and B channels carried by said basic interface and said primary rate interface lines; and connection means, coupled to said monitor means, for establishing a communication path to connect a terminal with said monitor means via said digital link interface, the first network, the second network and the digital line circuit controller so that at least one of the time slots of the B channels and the D channel to be monitored is transmitted along the communication path.

8. An ISDN line circuit channel monitor system as claimed in claim 7, wherein said ISDN line circuit channel monitor system further comprises input means, coupled to said digital link interface, for specifying at least one channel to be monitored.

9. An ISDN line circuit channel monitor system as claimed in claim 7, wherein:

said monitor means comprises a plurality of monitor devices coupled to said digital link interface controller; and said ISDN line circuit channel monitor system comprises input means, coupled to said digital link interface controller, for specifying which of the channels is to be monitored and which one of said monitor devices is to receive and monitor time slots of said specified channel.

10. An ISDN line circuit channel monitor system as claimed in claim 7, wherein:

said time slots of said B and D channels carry signals; and said connection means comprises:

first means for connecting, in two ways, said monitor means and a digital trunk of said second network;

second means, provided in said second network, for connecting first time slots and second time slots in two ways, said first time slots being transmitted between said monitor means and said second network, and said second time slots being transmitted between said first and second networks; and third means, provided in said first network, for connecting said second time slots and third time slots in two ways, said third time slots being transmitted between said first network and said digital line circuit controller.

11. An ISDN line circuit channel monitor system as claimed in claim 10, wherein said ISDN line circuit channel monitor system further comprises a signal controller which is coupled to said first network and which processes the signals of said time slots transmitted via the D channels, and wherein said connection means comprises fourth means for connecting said third time slots to said signal controller.

12. An ISDN line circuit channel monitor system as claimed in claim 7, wherein:

said ISDN line circuit channel monitor system further comprises a signal controller which is coupled to said first network and which processes signals to be transmitted via the D channels;

said second network for connecting, in two ways, said monitor means and said first network; and said second network, for connecting first time slots and second time slots in two ways, said first time slots being transmitted between said monitor means and said second network, said second time slots being transmitted between said first and second networks.

13. An ISDN line circuit channel monitor system as claimed in claim 7, wherein said communication path comprises a tandem exchange.

14. An ISDN line circuit channel monitor system as claimed in claim 7, wherein said communication path comprises a specifically allocated transmission line by way of which said monitor means is fixedly coupled to said digital link interface controller.

15. An ISDN line circuit channel monitor system, connected to an ISDN and a terminal, for monitoring B and D channels carrying time slots, comprising:

basic rate interface lines carrying B and D channels;

a primary rate interface line carrying B and D channels;

a digital line circuit controller which separates the time slots of the B channels from the time slots of the D channel carried by the basic interface lines;

a first network receiving together both time slots transmitted from the digital line circuit controller to the first network and time slots received by way of the primary rate interface line;

a second network which switches time slots transmitted from the first network to the second network, and which outputs switched multiplexed time slots to the ISDN;

monitor means, directly connected to the second network and operatively coupled to the digital line circuit controller and the primary rate interface line by way of the first network and the second network, for monitoring the D and B channels carried by the basic interface and the primary rate interface lines; and connection means, coupled to the monitor means, for establishing a path to connect channels of the basic interface lines with the monitor means by way of the digital line circuit controller, the first network and the second network, and to connect channels of the primary rate interface line with the monitor means by way of the first network and the second network, so that at least one of the B and D channels carried by at least one of the primary rate interface and the basic interface lines to be monitored is transmitted along the path.

16. An ISDN line circuit channel monitor system, connected to a terminal, for monitoring B and D channels carrying time slots, comprising:

basic rate interface lines carrying the B and D channels;

a primary rate interface line carrying the B and D channels;

a digital line circuit controller which separates the time slots of the B channels from the time slots of the D channel, carried by the basic rate interface lines;

a first network receiving together both time slots transmitted from the digital line circuit controller to the first network and time slots received by way of the primary rate interface line;

a second network which switches time slots transmitted from the first network to the second network;

a digital link interface controller coupled to the second network by way of a path, the digital link interface controller establishing the path for the time slots of the B and D channels;

monitor means, coupled to the second network and operatively coupled to the digital line circuit controller and the primary rate interface line by way of the first network and the second network, for monitoring the D and B channels carried by the basic rate interface lines and the primary rate interface line; and connection means, coupled to the monitor means, for establishing the path to connect the basic rate interface lines with the monitor means by way of the digital link interface controller, the digital line circuit controller, the first network and the second network, and to connect the digital link interface controller and the primary rate interface line with the monitor means by way of the first network and the second network, so that at least one of the B and D channels carried by at least one of the primary rate interface line and the basic interface lines to be monitored is carried along the path.

* * * * *